Feb. 23, 1971   D. C. LAVERTU ET AL   3,566,361

DATA MANAGEMENT COMPUTER DRIVEN DISPLAY SYSTEM

Filed July 9, 1968   9 Sheets-Sheet 1

Line No.  ←———— 40 Spaces ————→

| | |
|---|---|
| 1 | ADMITTANCE FORM |
| 2 | NAME (22 Spaces)     AGE  (3 Spaces) |
| 3 | ADDRESS (19 Spaces)  SEX  (1 Space) |
| 4 | CITY (13 Spaces)     STATE (8 Spaces) |
| 5 | etc. |

INVENTORS
DONALD C. LAVERTU
DONALD L. HUPFER
LOUIS F. MAJCHRZAK

BY *Louis* ...........
ATTORNEY

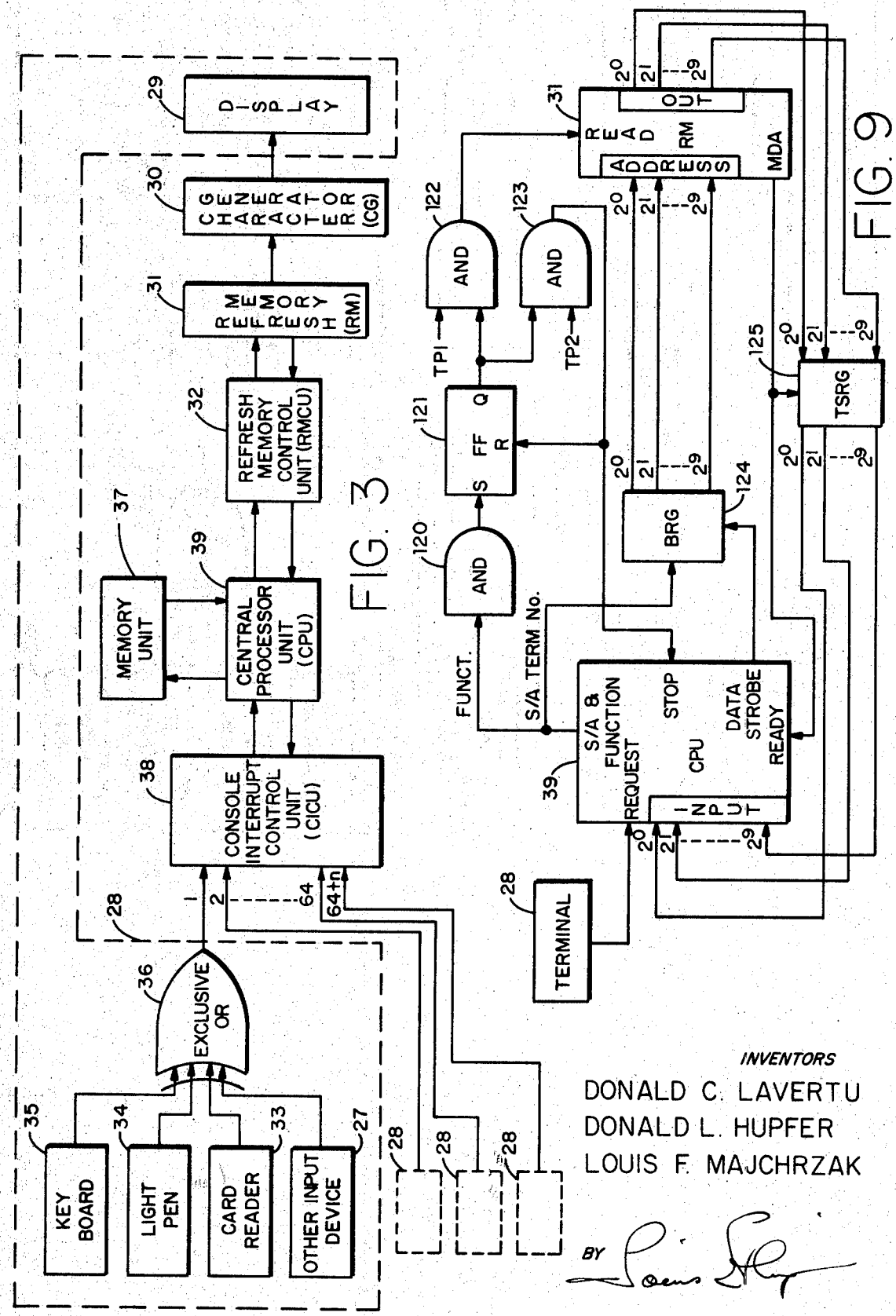

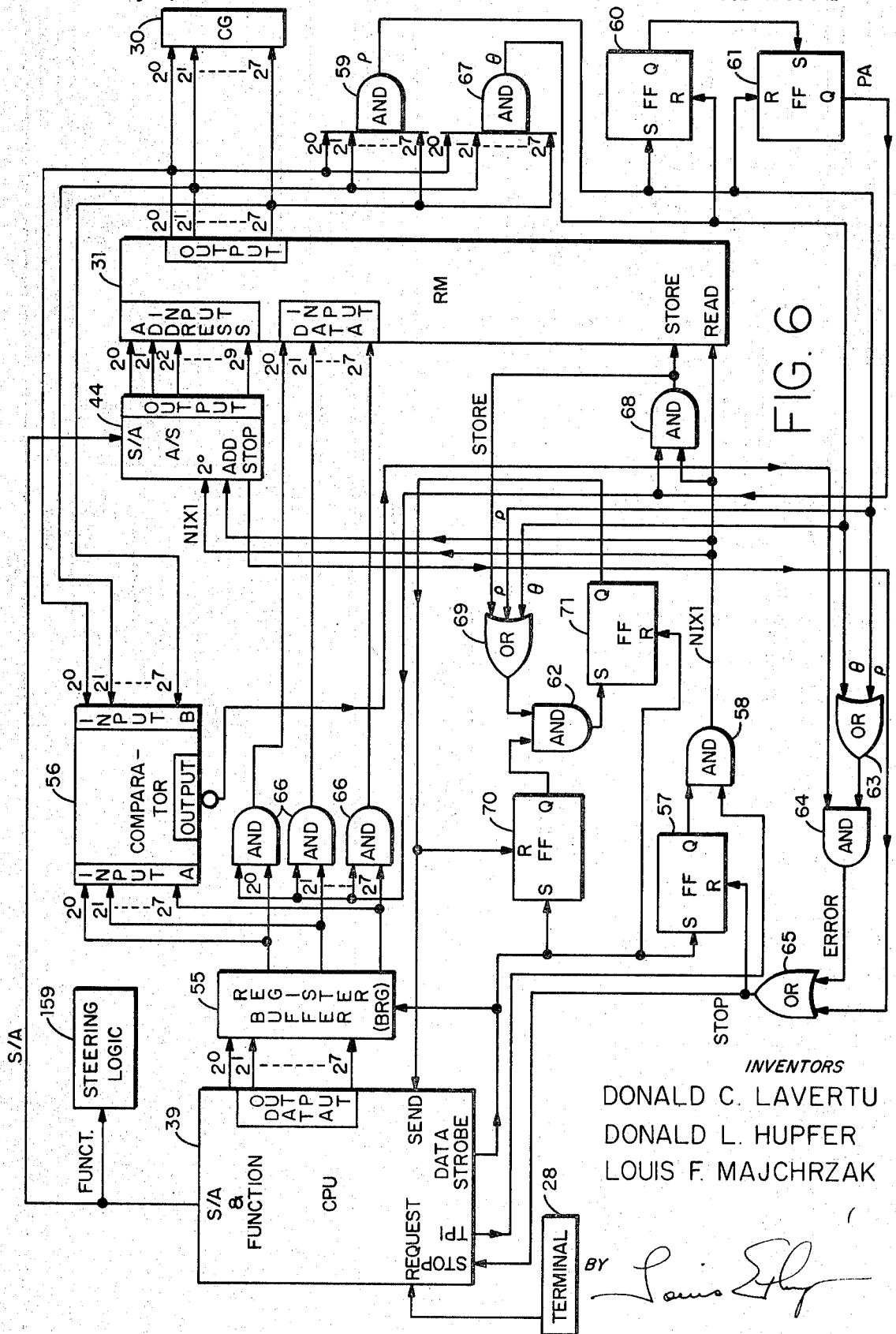

INVENTORS
DONALD C. LAVERTU
DONALD L. HUPFER
LOUIS F. MAJCHRZAK

BY *Louis F...*

ATTORNEY

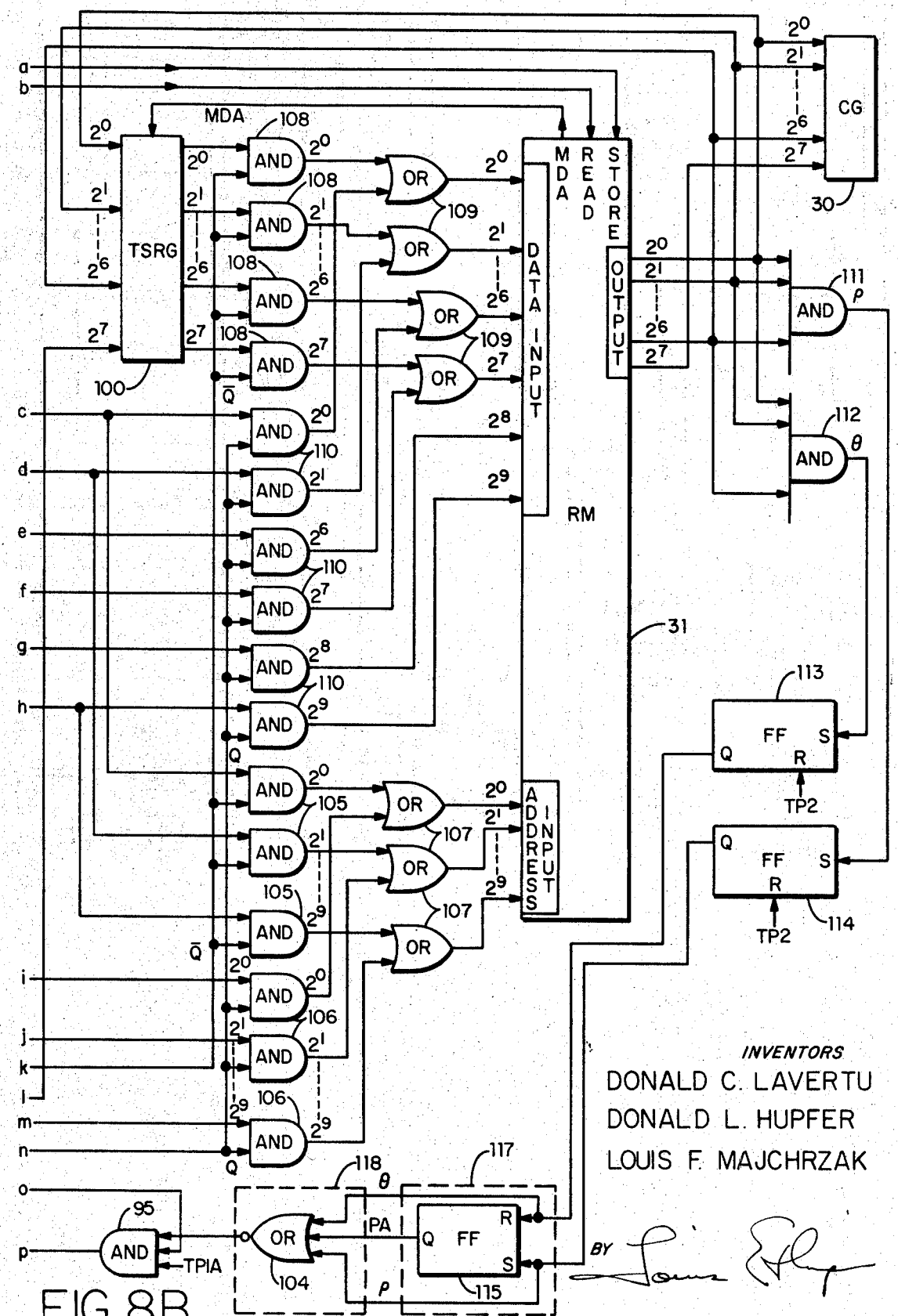

Feb. 23, 1971

D. C. LAVERTU ET AL 3,566,361

DATA MANAGEMENT COMPUTER DRIVEN DISPLAY SYSTEM

Filed July 9, 1968

INVENTORS
DONALD C. LAVERTU
DONALD L. HUPFER
LOUIS F. MAJCHRZAK

BY

ATTORNEY

Feb. 23, 1971  D. C. LAVERTU ET AL  3,566,361
DATA MANAGEMENT COMPUTER DRIVEN DISPLAY SYSTEM
Filed July 9, 1968  9 Sheets-Sheet 9

INVENTORS
DONALD C. LAVERTU
DONALD L. HUPFER
LOUIS F. MAJCHRZAK

BY *Louis Sky*

ATTORNEY 3,566,361
DATA MANAGEMENT COMPUTER DRIVEN DISPLAY SYSTEM
Donald C. Lavertu, Bedford, and Donald L. Hupfer and Louis F. Majchrzak, Reeds Ferry, N.H., assignors to Sanders Associates, Inc., Nashua, N.H., a corporation of Delaware
Filed July 9, 1968, Ser. No. 743,469
Int. Cl. G06f 3/14
U.S. Cl. 340—172.5
19 Claims

ABSTRACT OF THE DISCLOSURE

Logic is provided between computer and display to save main memory storage space while providing automatic protection from loss of identity of permanently stored characters such as those contained in a fixed form. A compressed form is sent from memory to display in uncompressed form by means of logic which allows variable lengths of spaces to be stored by a single character. Format control characters are utilized to determine word blocks while providing protection of characters from loss of identity.

Once the permanent characters composing the form are presented on any one of several displays, an operator may fill in the form with variable data. The "write" location, as represented by a cursor, is controlled in conjunction with the memory saving and protect features of the system such that the cursor location of a display terminal is automatically stored each time a character is written. In addition, other cursor control functions are utilized with the system.

Means are shown to compress the variable data for storage in order to further save memory space. Logic between the computer and the display also enables the recall of fixed format characters and variable data stored in separate locations such that they are sent to the display in an interlaced manner.

Additional features are shown whereby edit control characters may be self-protecting without the use of format control characters. Also, means are shown whereby program information for specific program use may be self-protecting and inserted in the unprotected word blocks without being displayed upon recall.

BACKGROUND OF THE INVENTION

(a) Field of the invention

This invention relates generally to computer driven display systems, and is more particularly concerned with digital means disposed between computer and display for saving computer time, saving memory space, protecting characters, and decreasing system response time, particularly where static data, such as fixed forms, are displayed with variable data.

(b) Description of the prior art

In the prior art there are a large number of techniques commonly employed for overlaying static information on a display cathode ray tube face. These techniques can be broadly classified as optical projection, direct view overlay and electronic.

Generally optical projection systems for displaying static information have consisted of means for front projection onto a cathode ray tube screen and means for rear projection through a ported tube. These systems are not computer driven and cannot be used in a multi-display system. Front projection techniques involve the use of a slide projector placed behind and over-the-shoulder of the operator in such a way as to focus the slide on the display screen. Difficulties are introduced by this method because of distortion introduced due to the non-normal angle projection and because of large registration errors. Also the system is very bulky.

Rear projection through a ported tube comprises the use of a slide projector to project the static information through an optical window and onto the display screen. However, this system requires many distortion corrections and alignment procedures. There is also poor response time and there are large registration errors.

Direct view overlay techniques although the least expensive, are limited to systems requiring infrequent change of static information. Direct view methods include edge-lighting, acetate overlays and grease pencil techniques. Because of the slow system response, high registration errors and non multi-display use, this technique cannot be used in a modern data management display system.

The third class of overlay or static information presentation techniques, and the one with which we are generally concerned is the electronic method. Within the broad class of electronic overlays, three data sources are commonly employed. These methods are video mapping, intensity gating and computer-generated. The video mapper presents a televised image of the desired overlay which can then be distributed to many display consoles. However, this method becomes bulky and expensive and also introduces some registration error. Also system expansion capabilities are limited. Intensity gating is used in radar applications to provide range rings and bearing strobe lines and is not useful in our system because of its lack of versatility in presenting complicated images.

The third data source of electronic overlay methods and the method with which we are most particularly concerned is the computer-driven display technique. In this technique, the computer writes the fixed data on the display in the same manner as the variable data is shown. This fixed data, for example, contained in a form, can be stored in a bulk storage device until it is needed. Systems which use computers to generate background data or static information have a number of significant advantages as well as some major limitations.

Advantages include simplification of system design and display interface since all data is treated in the same manner, improved registration of variable and fixed data, ease of expansion, and faster system response time. However, there are some limitations presented. Reduction in variable characters capable of being displayed is imposed because of the limited amount of displayable spaces in a given display console. The displayable spaces must be shared by the fixed characters and the variable data. Another limitation is the large memory required for each display so that fixed information may be recalled for anyone of several displays. Also, variable data will require additional memory when it is desired that it is to be preserved for future use.

More particularly, in a data management computer driven display system, for example, a type used in hospitals, many different fixed forms are filled out everyday. Forms encompass those used when the patient is admitted to those used in laboratories. These forms have associated with them many blank spaces which will be filled by variable data at a future time. In some systems, a very large amount of memory is used to store spaces. In addition, computer time and data phone line time, when used, is wasted due to the necessity of the system to transmit every character whether they be displayable characters or blank spaces.

In another system, display screen position information is stored for each character to be displayed. By this means blank spaces may be skipped because the address information stored with each character will control the placement of the cathode ray tube electron beam writing position. However, because this address information must be stored for each character, memory although not used for blank spaces, is used for address information and in some systems this tradeoff could result in even more memory space being used.

In yet another known system, spaces for variable information contained in the fixed form are represented by a character indicative of a fixed number of spaces. In a like manner, when variable data is inserted into the fixed form, this fixed space information must accompany the variable data and must correspond to the fixed characters of the form. In other words, when the fixed form is composed, it will contain fixed characters and characters indicating a fixed amount of blank spaces where variable data will be inserted. When the variable data is composed, it will contain variable characters and characters indicating fixed amount of blank spaces where the fixed format characters are. Although this technique does save some memory space, in some situations its effects is somewhat lost. For example, assuming the character indication for skipping spaces, horizontal tab, is equivalent to four skipped spaces, where for example fifteen blank spaces are required, three horizontal tabs are required and three spaces are required or a total of six characters to represent the fifteen blank spaces. It is desirable to reduce this number as will be shown in the present invention.

In addition to the desirability of saving memory space, it is also desirable to protect fixed format characters from erasure. It is also desirable to implement this by hardware, thereby reducing computer time.

SUMMARY AND OBJECTS OF THE INVENTION

Accordingly, a primary object of this invention is to provide a computer driven display system with an improved memory saving feature.

An additional object of the invention is to provide a computer driven display system incorporating automatic protection from loss of identity of certain characters in combination with the memory saving feature.

Another object of the invention is to provide an improved computer driven display system incorporating means to uniquely identity blocks of characters and at the same time provide automatic protection from loss of identity of said characters.

Another object of the invention is to provide a computer driven display system wherein a variable amount of spaces may be represented by one control character.

Still a further object of the invention is to provide a computer driven display system capable of storing a form composed of fixed characters and blank spaces in the main memory in a compressed form.

Another object of the invention is to provide a computer driven display system capable of storing variable data in the main memory in a compressed form.

Yet another object of the invention is to provide a computer driven display system which separates fixed characters and variable characters, stores said characters in separate locations of the main memory and upon recall presents them to the display in an interlaced manner.

Another object of the invention is to provide an improved computer driven display system wherein variable data may be unloaded from the display to the main memory independent of the fixed characters.

Still another object of the invention is to provide an improved computer driven display system wherein a maximum amount of characters displayable on the display console will be utilized by meaningful characters.

Still another object of the invention is to provide an improved computer driven display system which in combination with the memory saving features, protect features and other features, can manipulate a cursor in such a manner as to be capable of automatically finding unprotected character locations, stepping automatically to the next unprotected character location after a character is typed, skipping to the next unprotected character location after a protected character area, moving backward or forward one space or a given amount of spaces, and moving vertically one line or a given amount of lines.

An additional object of this invention is to provide a computer driven display system wherein edit control characters may either be protected by format control characters or may stand alone and be self-protecting.

An additional object of this invention is to provide a computer driven display system wherein main memory space is further saved by the use of self-protecting edit control characters.

Yet a further object of this invention is to provide an improved computer driven display system wherein program control information may be inserted with fixed characters and not be displayable when said fixed characters are presented to the display.

Another object of this invention is to maximize system response time, with respect to operator requests, by use of protected characters.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the computer driven display system of this invention comprises a terminal at which information is inserted into the system and displayed, a console interrupt control unit which allows expansion of the system to include a plurality of terminals, a central processor unit, a memory unit, a refresh memory control unit which relieves editing, format and protective burdens from the central processor unit, a refresh memory, and a character generator. The terminal is comprised of a keyboard, a lightpen, a card reader, other input devices, a circuit enabling only one of the above to enter information into the system at any given instant of time, and a display.

Our main attention in this invention is centered on the refresh memory control unit. In a working situation where a large volume of data must be immediately assessed and where such data is usually comprised of fixed forms and variable information to be inserted therein, every effort must be made to minimize memory storage space. Examples of situations where fixed forms must be combined with variable data are industry inventory forms, hotel and airline reservation forms, stock brokerage forms and various hospital forms. These forms include multiple amounts of vacant spaces wherein variable data must be inserted. In addition, it is very important to distinguish between fixed and variable information while protecting the former from erasure. The refresh memory control unit acomplishes these functions in addition to others.

Initially, the forms are originated by the operator by the use of the terminal. As seen and composed on the display the form is in uncompressed form; i.e., the form appears with not only the fixed format characters, but also the blank spaces which will later be filled in with variable data. The form is stored in the memory unit in compressed form through the use of programming techniques. By compressed form we means that form composed of fixed characters, format and edit control characters and abinary number indicating the length of each variable data block. A computer program is used to compress the form since this will be done usually only one time for each form entered into the system.

The organization of the stored information is controlled by means of first and second format control characters, edit control characters and skip space characters. The format control characters are used to define fixed blocks of characters and, in addition, they perform a protect operation. That is to say, characters between first format control character rho, $\rho$, and second format control character theta, $\theta$, are fixed and cannot, without further means, be erased by a cursor. Variable lengths of blank spaces left available for variable characters are represented by a binary number which always occurs after the second format control character, $\theta$. This number is interpreted as that amount of spaces to be skipped before the next fixed block of characters is written. Edit control characters comprise HOME, carriage return, horizontal tab and vertical tab. These edit control characters are interpreted by the character generator whereby HOME starts the display writing position in the uppermost, left-hand corner of the display, carriage return writes blank spaces for the remainder of its line and starts the writing position in the first space of the next line, and horizontal and vertical tab move the writing position of the display horizontally a given number of spaces and vertically a given number of spaces respectively.

The operator may call for a form to be displayed by using either the keyboard or lightpen. When the fixed format form, now stored in compressed form, is called, the refresh memory control unit (RMCU) will uncompress it so that the form will appear on the display as it was originally composed. Recognizer means for the format control characters, protect area means and skip control means are provided with an accumulator or adder/subtracter and other gating logic so that fixed characters are displayed and spaces for variable characters are properly composed.

Means are also provided for filling in the fixed form with variable data. The cursor character is written into the first unprotected location after HOME. The present cursor location on the display is erased and by use of format control character recognition, a search for the first unprotected location after HOME will commence starting at location "0." When the unprotected location is found, the cursor code is stored there and the cursor address is stored in the location specified for that terminal.

When a character is typed, essentially three functions occur in sequence. The logic first steers to the terminal number which the operator is on and unloads the cursor location into the central processor unit (CPU). The typed character is then loaded into the location where the cursor is, after which the cursor is written into the next unprotected location. The character is prevented from being written into that display position occupied by a protected character by use of the first and second format control character scheme.

Once the variable data is composed in conjunction with the displayed form, the variable data is stored in the memory unit in compressed form such that only format control characters and variable characters are sent to memory. Because of the use of format control characters and suitable logic, it is not necessary to store space information for the fixed format characters. Thus even more memory space is saved. The fixed form, being presently stored, never need be stored again and may simply be deleted from the display screen.

The fixed form being stored and the variable data being stored, at a future time the operator may recall them so that they appear on the display screen together. The operator by means of a lightpen or keyboard requests the system to display the form desired, after which he may recall variable data, where the system is used in a hospital, for anyone of several patients. Note that only one form is stored for any particular purpose and that variable data for each patient is stored separately. Because of this the fixed form and variable data are recalled to the display from separate locations. Nevertheless the fixed form and the variable data are written on the display in an interlaced manner. The use of format control characters, a comparator means and other logic insures that fixed format characters are protected and that said fixed characters and variable data will not be written over each other. Means are provided to interrupt the system should the interlacing apparatus malfunction.

By the above means then, it can be readily seen that the features of saving memory locations also increases reliability and decreases system response time since central processor time and data phone time are reduced. Also in a multi-user organization where forms are stored locally, only variable data need be sent thereby minimizing data phone time. In addition, the means for accomplishing the above automatically protects the desired characters.

In addition to all that is mentioned above, an additional embodiment includes the capability of providing self-protection for edit control characters. This allows HOME, CR, HT, and VT characters to stand alone in memory and not require first and second format control characters $\rho$ and $\theta$ to protect them. This saves some additional memory space which would have normally been required for the format control characters. Thus, the cursor will not be written over a $\rho$, $\theta$, HOME, CR, HT, or VT because all of these characters in addition to characters between a $\rho$ and a $\theta$ are protected.

Another embodiment allows the system the capability to insert certain program information for easier programming without displaying it. When a form is recalled to the display, only the edit and format control characters and characters between a $\rho$ and a $\theta$ will be loaded into the refresh memory and displayed even though the program information is stored with the form.

Thus, the computer driven display system of this invention is used in operations where static information is continually displayed with dynamic or variable information. This is the case in operations where a multiple of different fixed forms and an even greater multiple of variable data must be recalled at any given time. Thus our system not only saves large magnitudes of memory storage spaces but in addition protects said information. It is of course very important to protect information especially in operations where incorrect information or the lack of information could prove critical. In addition our system is useful where computer time and data phone time must be minimized in any way possible in order to increase their effective use. It is also important to make more efficient use of displayable character space on the display screen by utilizing characters in combination with a unique format control scheme to maximize the amount of useable characters displayed.

BRIEF DESCRIPTION OF THE DRAWINGS

The foregoing and other objects, features and advantages of the invention will be apparent from the following more particular description of preferred embodiments of the invention, as illustrated in the accompanying drawings:

In the drawings:

FIG. 1 illustrates the fixed format characters as they would appear on a display;

FIG. 2 illustrates the fixed format characters as they are stored in compressed form in the main memory;

FIG. 3 illustrates the general system block diagram of the present invention;

FIG. 5 illustrates the variable data characters as they are stored in compressed form in the main memory;

FIG. 6 illustrates the logic for uncompressing the compressed variable data stored in the main memory, and presenting it to the display;

FIG. 8A and FIG. 8B illustrate the logic employed to write and store the cursor in the first unprotected character location of the display;

FIG. 9 illustrates the logic employed after a character is typed for unloading the terminal number and cursor location into the computer;

FIG. 8B illustrates the logic employed to move the cursor back one space;

FIG. 11 illustrates the logic employed to write the cursor in the next unprotected variable data block;

FIG. 8B illustrates the logic employed to self-protect edit control characters when the cursor is being written into the first unprotected location of the refresh memory.

DESCRIPTION OF THE PREFERRED EMBODIMENTS

Figure 4:
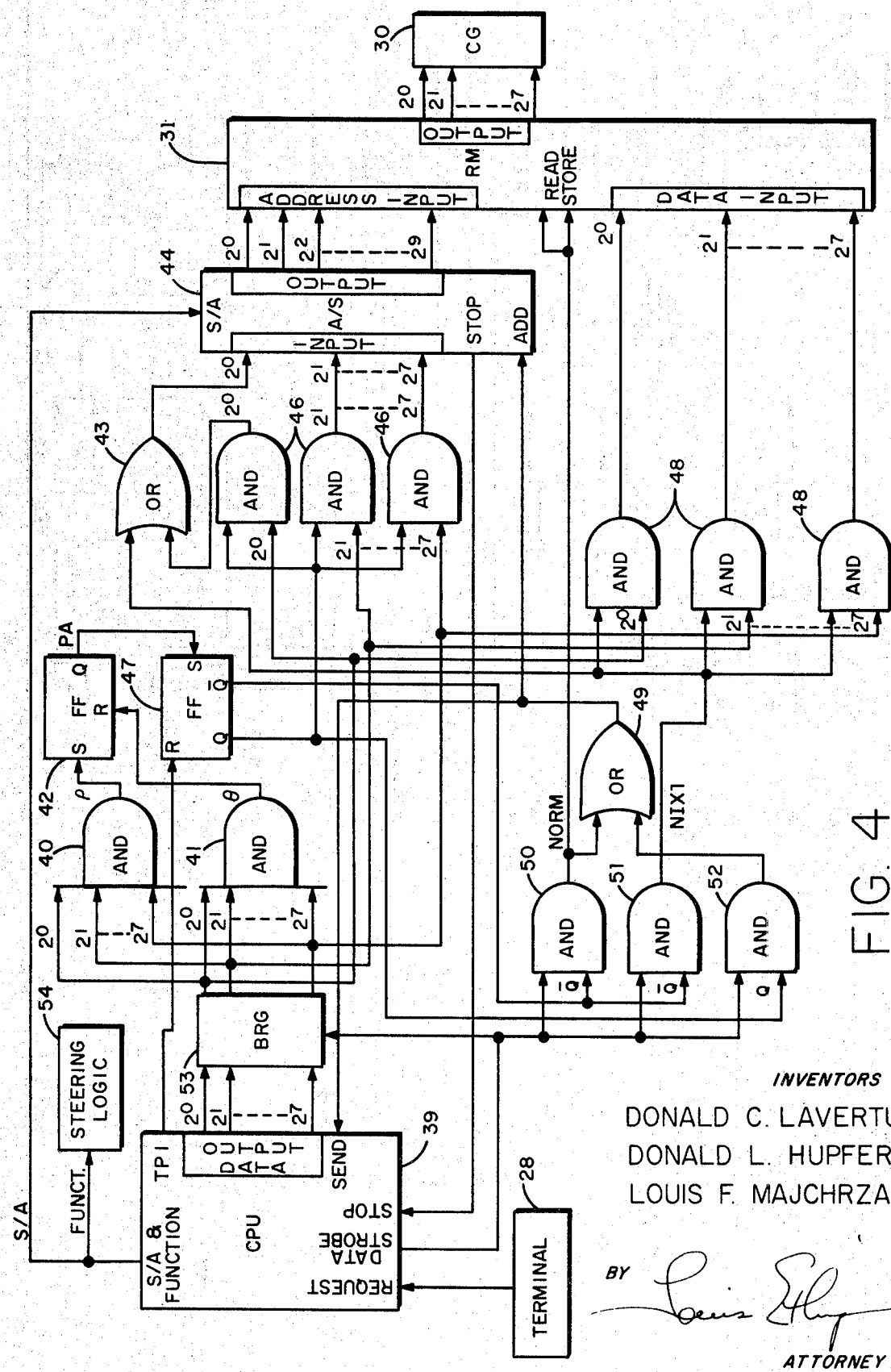
FIG. 4 illustrates the logic for uncompressing the compressed forms stored in the main memory and presenting it to the display.

Referring now to the drawings, FIG. 1 depicts a simplified form 10 displayed on the screen of a display 29, see FIG. 3. The displayed form comprises, for illustration purposes, forty horizontal spaces for each of four lines. Only fixed format characters are displayed. Edit control characters, format control characters, and variable data space information are seen as blanks on the display screen when simplified form 10 is presented. Ordinarily, such a fixed form will consist of many more fixed format characters. However, here for clarity and ease of illustration, we have shown only a few representative format characters.

With reference to FIG. 2 and FIG. 3, the simplified form of FIG. 1 is stored in memory unit 37 in a compressed form as shown in FIG. 2. Initially, the operator composes the fixed form 10 using a keyboard 35 and a light pen 34 which is operated on by the central processor unit, CPU39, in combination with other elements, until it is seen on the display unit 29. The operator is free to make changes in the form until the final form desired is ready for permanent storage in the memory unit 37. However, if desired at a later time, the form 10 may be updated, revised or deleted.

The operator then sends this uncompressed form 10 to the CPU39 which compresses the form 10 and stores it in the memory unit 37 in the compressed form as shown in FIG. 2. The CPU39 compresses form 10 by means of a computer program in conjunction with standard computer circuits. The use of a program for initially compressing the form 10 requires more computer time than would be necessary with a special purpose circuit of the type to be described later. However, since the fixed form 10 and any other forms are compressed only once, this excess computer time on a one-time basis for each fixed form is not an important consideration.

From FIG. 1, it can be seen that were all characters and spaces stored individually, up to 160 character storage spaces would be necessary in memory unit 37. Some other systems might reduce this by indicating blocks of a fixed amount of spaces by one character. In our system, variable lengths of blocks indicating spaces may be stored by one character. From FIG. 2, it can be seen that in compressed form, only 67 storage spaces 11 in the memory unit 37 need be utilized, thus resulting in a substantial savings of memory location. At this point, the control characters of FIG. 2 are explained:

$\rho$—A format control character, inserted before each fixed format word or words in order to define and protect the fixed format. A $\rho$ is also printed as a blank space on the display 29.

$\theta$—A format control character inserted after each fixed format word or words. All data after a $\theta$, and before the next $\rho$ character, is variable and unprotected. In one embodiment, edit control characters after a $\theta$ are self-protecting. During the sequence of uncompressing characters stored in memory unit 37 and transferring them to the display 29, the number after a $\theta$ is always interpreted as a binary number indicative of the number of spaces to be skipped for the variable data. A $\theta$ is also printed as a blank space on the display 29. Note: The Greek characters, rho, $\rho$, and theta, $\theta$, have been used for illustration only.

HOME—An edit control character used as a synchronizing signal, which when received by display 29, is interpreted as a starting point in the upper left hand corner of the screen of display 29.

HT—Horizontal tab, an edit control character, interpreted by display 29 to shift the writing position a fixed number of places to the right, in this embodiment four spaces to the right or left. Four blank spaces appear on the screen of display 29.

VT—Vertical tab, an edit control character, interpreted by display 29 to shift the writing position a fixed number of spaces vertically down, in this embodiment four lines down. Four blank lines appear on the screen of display 29.

SP—Space, generates one blank space.

CR—Carriage return, an edit control character, interpreted by the display 29 such that on any particular line where CR is generated, blank spaces are printed for the remainder of the line and the writing position of the next character on display 29 is shifted to the beginning of the next line.

With all the fixed forms necessary for the particular purposes of the system, stored in memory unit 37, the operator requests a particular form 10 by means of the keyboard 35 or light pen 34 contained in terminal 28. Also included in terminal 28 are the display 29, the card reader 33, any other input device 27, and the exclusive or circuit 36. Referring to FIG. 3, the exclusive or circuit 36 prevents simultaneous inputs from the keyboard 35, the light pen 34, the card reader 33, and any other input device 27 to the CPU39. The exclusive or circuit output is sent to the console interrupt control unit, CICU38. The CICU38 is basically a scanning circuit which, when signalled by any of a multiple of terminals 28, will seek and stop at that terminal to accept an input. The input information from one of the input devices will be, for explanation purposes, in the form of an 8-bit byte of information (A byte of data is formatted from 8 discrete bits of information. A byte of data is handled in the CPU39 in much the same fashion as a single bit.)

The initial request signal is then fed by the CICU38 to the CPU39. The CPU39 requests the memory unit 37 for the particular form 10, which is in memory unit 37 in a compressed form as shown in FIG. 2. The memory unit 37 sends the compressed form to the refresh memory control unit, RMCU32 via the CPU39. The RMCU32 uncompresses the compressed form. The uncompressed form is then sent to the display 29 via the refresh memory, RM31 and the character generator, CG30. The RM31 regenerates the form 10 onto the display 29 at such a rate that the data presented on the screen of display 29 appears always present to the human eye. The CG30 converts the code used in the CPU39 and memory unit 37 to another code necessary in order to control characters presented to the display 29.

One of the main features of this invention is the ability of RMCU32 to uncompress the form 10 from its compressed form as shown in FIG. 2. Now referring to FIG. 2 and FIG. 4, the CPU39 transfers all characters from its character output terminals. Each time a character is transferred from the CPU39, a data strobe output also occurs. Note that the RMCU32 includes all elements except terminal 28, CPU39, RM31, CG30 and display 29. When the system is first initiated by a REQUEST signal from terminal 28, where said REQUEST signal is composed of the terminal number with starting address and function required, the CPU output generates two control words. The first control word is the starting address which directs the accumulator or adder/subtracter, A/S44 to the proper address position. The second control word is the function command which directs steering logic 54 such that the logic elements as shown in FIG. 4 are essentially connected together as shown. This steering logic 54 consists of AND gates and OR gates, wired such that on a certain command certain logic elements are "in" the circuit while other logic elements are "out" of the circuit. This type of steering logic is well known in the art and need not be further explained.

The CPU data output lines and the starting address and function lines are actually the same output lines, but are shown separately for clarity. The data output, for illustration purposes, is composed of eight lines for eight bits, the first seven bits composing a 7-bit American Standard Code for Information Interchange, ASCII; while the $2^7$ binary bit is used to indicate a writing position or cursor indication to be explained later. The starting address and function lines may comprise up to 16 binary bits in one system.

The A/S 44 is basically a 10-bit adder or accumulator consisting of one full adder and one flip-flop per bit with logic elements arranged on its input so that on an ADD command a binary addition of the adder inputs to an accumulated sum takes place and on a SUBTRACT command, these logic elements add all logical ones to each input of the 10-bit adder, resulting in a subtract operation. In addition, A/S44 has a reset input and also will generate an output for a predetermined accumulated number. This type of adder/subtracter is commonly known in the art and is not explained here.

The first character to be sent after the two control words is the first format control character $\rho$. The characters transferred from the output of CPU39 are temporarily stored in buffer register, BRG53, which is enabled for storage by the data strobe pulse. AND gate 40 is wired such that it will recognize the character $\rho$ and generate an output pulse $\rho$ only when a $\rho$ is present at its input; i.e., a $\rho$ conditions AND gate 40. The output of AND gate 40 sets protect area, PA, flip-flop, FF42. The protect area flip-flop insures that the fixed format characters will be sent to the data input of RM31. The Q output of FF42 now assumes a positive state and is connected to the input of skip control flip-flop, FF47. However, FF47, unlike FF42, will be set only when FF42 is reset by the second format control character, $\theta$. The character $\rho$, is inhibited by AND gates 41 and 46. Also, TP1, generated by CPU39, is continually resetting FF47 such that only the $\bar{Q}$ output of FF47 is positive.

Output $\bar{Q}$ of FF47 in combination with the data strobe pulse fully conditions AND gate 50 and AND gate 51. The output of AND gate 50 is the NORM line which directs RM31 to READ and STORE on its rising edge and which, through OR gate 49, directs A/S44 to ADD on its falling edge. When the term READ is used, any character stored at the address indicated will be read at the output RM31 and will be subsequently operated on by various circuits. When the character is to be read onto the display 29, it is actually read during a refresh cycle. The READ command, which occurs during an edit cycle, has, in actuality, its characters read, blanked from display 29 by CG30. For ease of discussion and illustration, READ will mean that a character does occur at the output of RM31 and at some cycle time is read onto the display 29. The output of AND gate 51 is the NIX1 line which conditions AND gates 48 on its rising edge to allow a character into the data input of RM31 and which, through OR gate 43, on its falling edge, directs A/S44 to increment itself by $2^0$. In accordance with this, the Normal Increment by One, NIX1, pulse allows the $\rho$ through AND gates 48 to RM31, and is read on display 29 and stored in RM31 by the presence of the NORM pulse at the binary 0 storage address. During the refresh cycle, CG30 interprets the $\rho$ as a blank space which space is then read on display 29. After this, the NIX1 command is allowed through OR gate 43, whose output steps A/S44 by $2^0$ so that the next character will be stored in the $2^0$ address position.

In summary then, from the above, the following basic operations have occurred essentially in simultaneous sequence:
(a) FF42 is set via AND gate 40.
(b) AND gates 50, 51 and 48 are conditioned.
(c) $\rho$ is transferred to the data input of RM31.
(d) RM31 is directed to STORE the $\rho$ at the S/A binary 0 address position.
(e) $\rho$ is read on display 29 as a blank space during the refresh cycle.
(f) A/S44 is directed to ADD a binary $2^0$.
(g) The address input of RM31 is stepped by $2^0$.

Before the next character may be transferred by CPU39 to BRG43, the CPU39 must be commanded to send another character. The means to do this is provided by AND gates 50 and 52, and OR gate 49. The CPU39 is requested to SEND another character to BRG53 each time an ADD command is generated at the output of OR gate 49.

Now that the $\rho$ and its address location have been stored, the next character to be sent by the CPU39 is edit control character HOME. The HOME character is allowed through AND gates 48 because of the presence of NIX1 generated by the data strobe, and is stored in RM31 due to the NORM command at the RM31 STORE input. Remember that the NORM was generated due to the presence of data strobe and the $\bar{Q}$ output of FF47 at the inputs of AND gate 50.

A/S44 then outputs a pulse on the binary $2^0$ line as the address of the HOME character in RM31. RM31 then transmits HOME to the display 29 which interprets HOME in such a way that the beam of the cathode ray tube contained in display 29 is directed to the upper left hand corner of the display screen. The HOME character, therefore, has a synchronizing effect on the system, and is protected along with other characters by the $\rho$ preceding it, as will be explained more fully later. The NIX1 pulse then increments A/S44 by $2^0$ because of the presence of an ADD command, as opposed to a SUBTRACT command. The CPU39 is then requested to SEND another character.

The HT edit control character is transferred to the display 29 in the same manner that the HOME character was above. A/S44 then transfers to RM31 a binary $2^1$ representative of the number 2 address position in RM31 where HT will be stored. The HT character is stored in the RM31 in the $2^1$ address position and is then transmitted to display 29. The display interprets HT, in this embodiment, as four horizontal blank spaces. An HT could have been predetermined to indicate any number of blank spaces. The next HT edit control character is treated in the same manner as that discussed directly above.

The first character in the first fixed format word block to be written on the display screen is acted upon in the following manner. The A character is transferred from CPU39 to BRG53 and is inhibited by AND gates 40, 41 and 46. The character A is steered through AND gates 48 because of the presence of NIX1 pulse. The NORM pulse then generates a READ and a STORE command, whereby the character A is read on display 29 and is stored at its address location in RM31. The address location for the character A was that position accumulated by A/S44 via the incrementing action for each previous character through AND gate 51 and OR gate 43. The character A, on the presence of the READ command, is then transferred from RM31 to CG30 on eight binary lines, seven of which indicate the character in ASCII code, the other of which indicates the presence of a cursor. The CG30 encodes the seven bit character into a different code necessary to generate, in this embodiment, a racetrack pattern with the necessary strokes blanked out to form the character. It should be understood that any character generator commonly known in the art could have been used. The character A is then displayed on display 29. The A/S44 is then incremented by one space by the presence of the NIX1 and ADD commands. In addition, a request to send another character is received by CPU39. This operation is typical for all characters and spaces to be written on display 29 and is repeated for all fixed format characters.

The CR edit control character is transmitted to the display 29 in the same manner that the HOME and HT characters were. The display 29 interprets CR in such a way that it will print blank spaces for the remainder of the line on which CR occurred and will then step the line counter of display 29 to the next line while resetting the space counter of display 29 so that the next character will be printed on the first space of the next line.

After the fixed format word NAME is stored and read, the end of the fixed format word is indicated by second format control character, $\theta$. All data after a $\theta$ is variable and unprotected. The number after the $\theta$ is always interpreted as an indication of the number of spaces to be skipped and left blank for the variable data. A $\theta$, like $\rho$, is also printed as a blank space. When a $\theta$ is presented by the CPU39, the following occurs. Recognizer AND gate 41 is wired such that only a $\theta$ will fully condition it so that the output $\theta$ will be generated. The trailing or falling edge of $\theta$, i.e., the transition from a positive state to a zero state, will reset FF42 such that the $\overline{Q}$ output of FF42 will go from a positive state to a zero state thereby setting FF47. However, before this occurs, and during the presence of a $\theta$, the following occurs. When the $\theta$ is presented by the CPU39, the data strobe pulse simultaneously occurs. Since $\overline{Q}$ of FF47 is still positive, AND gates 50 and 51 will allow as outputs, NORM and NIX1, respectively. NIX1 will allow the $\theta$ to be steered through AND gates 48 to the data input of RM31 and the NORM will command RM31 to read and store the $\theta$. NIX1 and NORM will then add $2^0$ to A/S44 which increments RM31 by $2^0$ to RM31 position 25. The $\theta$ will be printed on the display 29 as a blank space as the $\rho$ was. Note that all of the above has occurred during the presence of a $\theta$.

When the $\theta$ pulse goes to a zero state as described above, FF47 will be set such that its output $\overline{Q}$ will now go to a zero state and its Q output will go to a positive state. FF47 will again be reset by TP1 which will next be present after the binary skip number. Because of this, AND gates 50 and 51 are no longer conditioned, while AND gate 52 is conditioned and will allow an output through OR gate 49 which will command A/S44 to ADD on its falling edge. After the format control character $\theta$, the CPU39 transfers the skip space information for variable data. In our example, the amount of spaces to be skipped is 22 and is represented by a binary number. This skip space information is inhibited by AND gates 48 because of the absence of NIX1 and the skip space binary number 22 is not stored in RM31 because of the absence of NORM. However, AND gates 46 have now been enabled to allow the skip character 22 to be added in A/S44. The skip character 22, represented by bits at $2^1$, $2^2$, and $2^4$, is added to the number already accumulated in A/S44. In our example, A/S44 was accumulated to position 25. A/S44 then adds the skip character 22 so that the next character to be printed on display 29 will be at position 47 of the display 29. Note that numbers indicating position in memory and position on the display must not be confused. A/S44 then addresses RM31 with bits representative of the binary number 47. The next character, which in this case is a $\rho$, starts a new cycle as has been described above.

This feature, shown above, for this very short cycle, has used only 26 character storage spaces of memory unit 37 while writing 48 characters on display 29. Note that format control characters, although written as blank spaces, lend better readability to the displayed form because of the spaces left between fixed format words and variable data. Thus, these format control characters may be interpreted as a useful written display character. As this cycle is repeated, more memory spaces will be saved. This is an important feature in a system where hundreds of fixed forms will be stored. A unique memory saving logic has thus been shown. In addition, characters between first format control character $\rho$ and second format control character $\theta$ have been defined as the fixed format characters, and will, as will be shown later, be protected from erasure by the cursor.

A/S44 will continue to accumulate until the end of the page; i.e., until the amount of characters capable of presentation on display 29 has occurred. In one embodiment, up to 1024 characters may be accumulated in A/S44, while up to 2048 character positions are available on display 29. When the 1024th character has been accumulated in A/S44, A/S44 will send a STOP command to CPU39. At this time, the operation is complete and the entire form is visible on display 29. The operator may now insert variable data in the unprotected spaces between the $\theta$'s and $\rho$'s in sequence.

The fixed format now presented on the display 29, the operator is ready to fill this form with variable data. For example, patient's name, age, etc. When the fixed form is called to the display 29, a cursor might be displayed at any one of many locations. It is therefore necessary, in order to start typing or inserting the variable data, to place the cursor in that position where the first variable character is to be displayed.

Briefly, let us describe the function of the cursor. The cursor is an electronic indicator means which is visible on the display screen and designates the location where the next character typed will be inserted. This cursor is basically an unblanked, 10 stroke, racetrack pattern, but could be stroke combinations of any type character generator, controlled, if desired, so that it is in a blinking mode, in order to better attract the attention of the operator, CG30 will generate the racetrack pattern, or cursor, at the address indicated by RM31. One of CG30's binary inputs, namely, the $2^7$ input in this embodiment, is a logical one when a cursor function is designated. When a logical zero is present at the $2^7$ binary input, the racetrack pattern, that is, the cursor, will not be displayed; but instead, a character or a blank space will be presented to display 29 as indicated by the binary inputs of $2^0$ and $2^6$.

Because the fixed format characters and format control characters must be protected, means must be established to disable the cursor from being written over them. Thus, in this system, it will be necessary to disable the cursor when a $\rho$, $\theta$, or characters between a $\rho$ and a $\theta$ are read out of RM31. Remember that the characters after a $\rho$ and before a $\theta$, that is, between a $\rho$ and a $\theta$, will always be fixed format characters and must be protected. When the operator first requests that the fixed format form be presented to display 29 as stated, the cursor might be presented at any one of several unprotected locations. Therefore, it will be necessary, in order to present the cursor at the first unprotected character location at the uppermost left-hand corner of the display, to clear the cursor from any one of its possible locations and to set the address input of RM31 to zero; that is, the uppermost left-hand corner character location. The next step in the process is to sequentially scan the character locations in search for the first unprotected location in RM31, at which point the cursor will be written and stored.

Because RM31 must accommodate up to eight displays in one embodiment, it is divided into eight memory segments. The number of displays accommodated and associated memory segments could be increased or decreased. Data from each display must be steered into its proper terminal memory location. In order to do this, the location of the cursor is stored in RM31 in a location for that particular terminal. When the cursor is finally stored, the address of the cursor will be available in RM31. It will then be a very simple process for CPU39 to find the location of the cursor for any particular terminal. When the above steps have been accomplished, the CPU39 will be directed to stop and the operator will then be able to type in the variable data.

Figure 8A:
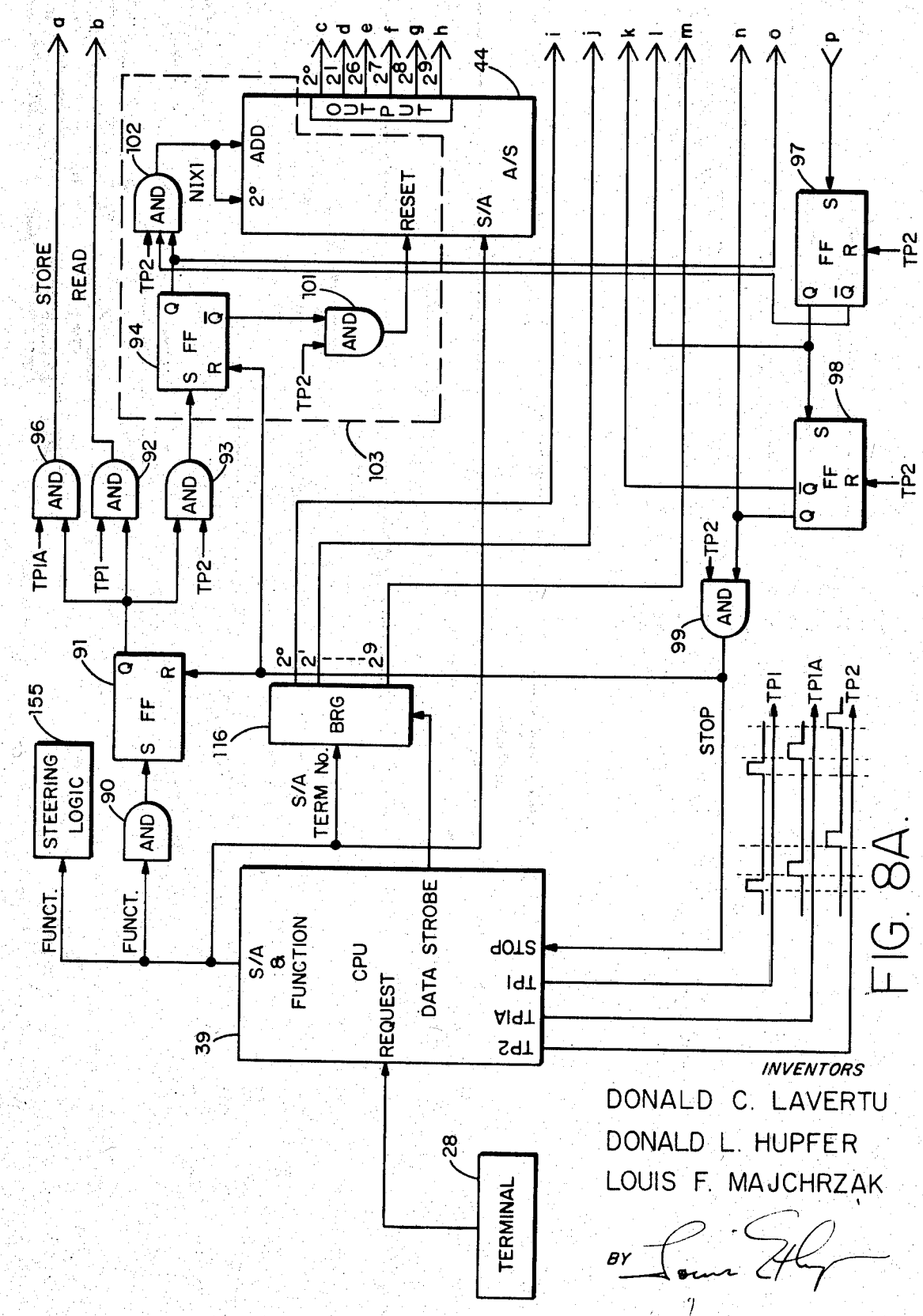

Now referring to FIG. 8A and FIG. 8B, on request CPU39 sends a starting address, S/A, to A/S44. Note that FIG. 8A and FIG. 8B are joined as designated by the lower case letters, i.e., a to a, b to b, etc. This starting address will be the location of the cursor on display 29, if in fact, there is a cursor present. The next control word, indicating the function, will condition AND gate 90 setting up the steering logic 155 for the circuit in FIG. 8A and FIG. 8B, and will set FF91. A/S44 will also transfer the address, which has been sent to it by CPU39, to RM31. The address to RM31 from A/S44 is steered through AND gate 105, since FF98 is not set and its $\bar{Q}$ output is a logical one. The address is then allowed by OR gates 107. In addition, the starting address is stored in BRG116, which has been enabled by the data strobe from CPU39. The contents of BRG116 will not be used until a cursor location in the first unprotected area is established.

CPU39 generates Timing Pulses TP1, TP1A, and TP2, which establish timing cycles for this function. It is obvious that CPU39 could have generated an initial timing pulse, synchronizing a clock not shown which would set the sequence of timing pulses. FIG. 8A indicates their respective sequence; i.e., TP1 is first in time, immediately followed by TP1A, and later by TP2.

FF91 having been set, AND gate 92 will, on the presence of TP1, command RM31 to read. The output of RM31 will be stored in temporary storage register, TSRG100 on the presence of the Memory Data Available, MDA, pulse from RM31. The MDA pulse will be generated at any time that RM31 transfers a character from its output. Because FF98 is still not set, AND gates 108 will remain enabled, and will allow the output of TSRG100 to be sent through OR gates 109 into the RM31 data input.

A very important feature of this system should be noticed at this time. Remember that we are trying to delete the cursor, if one is present at the output of RM31. Therefore, the bit $2^7$, output of RM31, representative of the cursor, is not sent to TSRG100. Instead, the Q output of FF97 is connected to the $2^7$ input of TSRG100. Because FF94 is not set, and whether or not TP1A is present at AND gate 95, the Q output of FF97 is a logical zero. Note that FF94 will not be set until the first TP2 goes to a logical zero. Therefore, the cursor input to TSRG100 will be a logical zero. Therefore, RM31 will receive a logical zero in the $2^7$ bit location representative of a cursor, indicating that no cursor will be stored at that address. When TP1A is presented to AND gate 96 and since FF91 remains set for this entire function, a STORE command will store the contents of RM31, such that the output previously generated by RM31, but without the cursor bit, is now stored in RM31. Thus, any cursor present on the display has been erased.

The next step will be to set the address input of RM31 back to the uppermost left-hand character location of display 29; that is, generate all zeros at the RM31 address input. When TP2 is next generated, there will be an output from AND gate 93. This output will not set FF94 until its set input goes from a logical one to a logical zero. Therefore, the Q output of FF94, in combination with TP2, will generate a RESET command through AND gate 101 to A/S44. This RESET command will establish all zero bits on the output lines of A/S44. This zero address will be steered through AND gates 105 and OR gates 107 such that the address input of RM31 will be zero. Notice, also, that TP2 is continually resetting FF97, 98, 113, and 114. On the trailing edge of TP2, FF94 will be set such that its Q output will be present at one input of AND gate 102, and one input of AND gate 95. The output of AND gate 102 will not be allowed until the next TP2. When TP1 is again presented to AND gate 92, a READ command will read the output of RM31 at its zero location. As previously shown in FIG. 2, the first location contained a $\rho$. However, the first location could have contained any character. The second possibility will be discussed later.

As previously stated, means must be established to protect the characters $\rho$, $\theta$, and characters between $\rho$ and $\theta$. Therefore, the following description will describe that process. When a $\rho$ is transferred from RM31, recognizer AND gate 111, which is wired to allow a $\rho$ only, will send a pulse to the set input of FF114. This pulse will establish a logical one at the Q output of FF114. Both the set and the reset inputs of FF115 will not function until the set and reset inputs go from a logical one to a logical zero. The logical one, appearing on the Q output of FF114, will be presented to OR gate 104. OR gate 104 contains an inverted output as designated by the small circle at its output on the drawing. Therefore, the only time that a logical one will appear at the output of OR gate 104 will be when all three of its inputs are a logical zero. Since the input of OR gate 104 is now a logical one, when TP1A is presented to AND gate 95, no setting action of FF97 will take place. Remember that the Q output of FF94, one of the inputs of AND gate 95, remains a logical one until a STOP command is received. Therefore, the Q output of FF97 will remain a logical zero, as will the Q output of FF98. The Q output of FF97 must be a logical one, otherwise no cursor bit will be stored; that is, if FF97 is set, a logical one at its Q output will be interpreted by CG30 as indicative of an unblanked racetrack pattern; namely, the cursor.

In addition, when TP1A is present, a STORE command will be generated through AND gate 96 to RM31. The $\rho$, in addition to being sent to AND gate 111, has also been temporarily stored in TSRG100, and will be steered through AND gates 108 and OR gates 109 into the data input of RM31. The STORE command will then store the $\rho$ back into RM31, and the cursor bit will be disabled because it is a logical zero.

FF94 remains set, and when TP2 is presented to AND gate 102, a NIX1 pulse is generated, incrementing A/S44 by $2^0$, and commanding A/S44 to add this increment to its previous address, in this case, zero. When TP1 is again presented, the next character to be written out of RM31, again referring to FIG. 2, will be the HOME character. The HOME character, like all of the characters, will also be sent to TSRG100. Because FF114 had been previously set and then reset by TP2, FF115 was set so that its Q output is a logical one. FF115, which is a protect area device, will be set or reset only when these inputs go to a logical zero. As stated before, if a logical one is presented to any one of the three inputs of OR gate 104, the Q output of FF97 will be a logical zero. The Q output of FF97 being a logical zero, a cursor bit, designated by a logical one, will not be sent to TSRG100 and subsequently to CG30. Thus, when a READ command is generated on the presence of TP1, and then, when a STORE command is again generated by TP1A, the character HOME will be stored in RM31 such that any contents of RM31 which have been transferred to TSRG100, and is to be protected, will not be lost, TP2 will again increment A/S44 and this address position will be sent to the address input of RM31 via AND gates 105 and OR gates 107, so that upon the next READ command, the next character location in RM31 will be read.

The next character to be read from RM31 will be the edit control character, HT. It will be acted upon in exactly the same manner as edit control character HOME; that is, FF115 remains set, still presenting a logical one from its Q output to one input of OR gate 104. Thus, the Q output of FF97 remains a logical zero, and a cursor bit will not be stored at the address location in RM31. All the remaining characters, as shown in FIG. 2, up to and including character "E," at position 23, will be treated in the same manner. When the format control character θ is read out of RM31, it will be stored in TSRG100. The θ will also generate a pulse at the output of recognizer AND gate 112. AND gate 112 has been wired to transfer a pulse only when a θ is present at its input. The output of AND gate 112 will set FF113. The Q output of FF113 will not reset protect area flip-flop FF115 until FF113 is reset by TP2. However, the Q output of FF133 now being a logical one, this input to OR gate 104 will also be a logical one. This being the case, a logical zero will be established at the output of OR gate 104 and AND gate 95 will inhibit an output on the presence of TP1A. Therefore, the Q output of FF97 remains a logical zero, and when TP1A generates a STORE command via AND gate 96, RM31 will store this θ, and the cursor designation bit will not be present. Thus, CG30 will interpret all characters as they have existed in RM31, and these characters will not be substituted for by a cursor symbol. Note that the cursor bit, being a racetrack pattern, merely overlays any possible character which might be displayed, when all strokes of the racetrack symbol remain unblanked. The unblanking, as stated before, is accomplished by sending a logical one out of the binary $2^7$ output line of RM31, and is interpreted by CG30 as a cursor. CG30 will then logically control the display character at that address by presenting a blinking racetrack pattern.

Because FF133 and FF114 have been reset by TP2, and because the Q output of FF113 has now gone from a logical one to a logical zero, FF115 will be reset so that its Q output is now a logical zero. Because FF133 and FF114 have also been reset, OR gate 104 will now have established, on each of its input lines, a logical zero. Therefore, a logical one will now be present at the output of OR gate 104. When TP1A is generated, AND gate 95 will enable a pulse setting FF97. The Q output of FF97 will now become a logical one, but it will not set FF98 until it again goes to a logical zero. Because the Q output of FF97 is now a logical one, a cursor indication will now be stored in TSRG100. Because the $\overline{Q}$ output of FF98 is still a logical one, AND gates 108 remain conditions and a cursor bit designation will be sent to the data input of RM31. The $\overline{Q}$ output of FF97, now being a logical zero, will disable any further incrementing of A/S44 because AND gate 102 will not be conditioned.

It is now important, for future CPU39 processing, to store the location and terminal number of the cursor, which has been sent to RM31. When TP2 resets FF97, the Q output of FF97, changing from a logical one to a logical zero, will set FF98. TP2 will not reset F98 until TP2 is again present and goes to a logical zero. The Q output of FF98 will enable AND gates 106 and AND gates 110. The terminal number which has been stored in BRG116 will now be allowed through AND gates 106 and OR gates 107, into the address input of RM31. The output of A/S44 indicates the address of the cursor in that particular terminal. This cursor address will be allowed through AND gates 110 and sent to the data input of RM31 via OR gates 109. When TP1 and TP1A again occur, this address of the cursor with its terminal number will be read and then stored in RM31 at the location for that terminal such that on future occasions, the CPU39 may readily secure the location of the cursor for any of the terminals.

When TP2 again occurs, it will be sent to one input of AND gate 99. Because the Q output of FF98 is still a logical one, AND gate 99 will generate a STOP command, which will command CPU39 to stop this function. The STOP command will also reset FF91 and FF94 such that they will be ready for the next operation.

As previously stated, the first character which could have been present in the upper-most, left-hand corner, character location of display 29 could have been any character. In our example above, it was a ρ. The following is a brief explanation for the circumstance where an unprotected character is read. Because neither a ρ nor a θ appears at the output by RM31, FF113 and FF114 are not set. Thus, FF115 is not set. Because the Q outputs of the three above-mentioned flip-flops are a logical zero, OR gate 104 will send a logical one to AND gate 95. The Q output of FF94 remaining a logical one, when TP1A occurs FF97 will become set so that a cursor bit is presented to the binary $2^7$ input of TSRG100. A cursor is then viewed at this first address position on display 29. The cursor location being established, the cycle will continue as mentioned previously, until a STOP command is received by CPU39.

It has thus been shown means for erasing a cursor, a systematic searching for the first unprotected character location, storing a cursor at this location, and then storing the terminal number and the address at which this cursor has been stored. The system is now ready for the operator's next command wherein the operator will type in variable data and in the process, should the operator deem it necessary, may manipulate this cursor as discussed by the following.

Now that the cursor has been placed in the first operating location after HOME, the operator may now fill in the form. When the operator types a character, the following three steps are programmed between the terminal 28, the CPU39, RM31 and RMCU32. In sequence, the logic first steers to the terminal number which the operator is on and unloads the present cursor location into CPU39. The character is then loaded into the location where the cursor is and the cursor is subsequently written into the next unprotected location.

Now referring to FIG. 9, when the operator types the character desired, the character information and terminal number are sent to the request input of CPU39. CPU39 then sends the terminal number address to BRG124 which has been enabled by the CPU data strobe. The next control word out of CPU39, that is, the function command, is allowed through recognizer AND gate 120 which will present a pulse output only when this function is received. The output of AND gate 120 sets FF121. On the occurrence of TP1 at one input of AND gate 122 and because the Q output of FF121 is a logical one, a READ command will be sent to RM31. When this READ command is received by RM31, the address from BRG124 will be interpreted as a request for the cursor location for that particular terminal. The cursor location will then be read out of RM31 into TSRG125 which has been enabled by the MDA output pulse of RM31. The MDA pulse will be generated at each time RM31 has data available at its output. The MDA pulse will also signal CPU39 that data is ready for its input. This data will then be sent by TSRG125 to the input of CPU39. When TP2 occurs, there will be an output from AND gate 123 which will stop this sequence and reset FF121. Thus, the cursor location has been sent to CPU39 and the program in combination with the logic circuits must now write a typed character into the character location where the cursor is.

Figure 10:
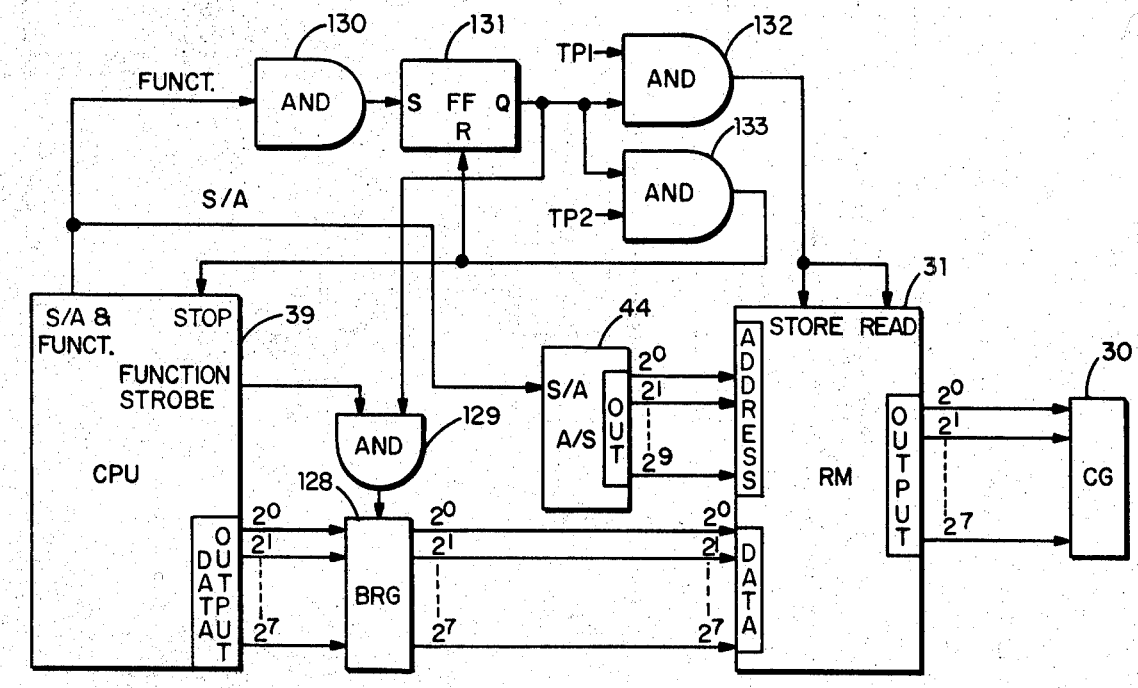
FIG. 10 illustrates the logic employed after a character is typed for writing the typed character into the cursor location.

Now referring to FIG. 10, the CPU39 will transfer a starting address, indicative of the just received cursor location, to A/S44. The next control word, that is, the function command, will be allowed through recognizer AND gate 130 and will set FF131. On one input of AND gate 129 there will be a logical one because FF131 is set. With the other input to AND gate 129, that is, the function strobe from CPU39, a pulse is allowed through AND gate 129 and enables BRG128 to store the character output from CPU39. Note 5 that a function strobe occurs each time a function control word is sent from CPU39. When TP1 occurs, this will allow a pulse through AND gate 132 and will generate a READ and a STORE command to RM31. The STORE command will store the character in BRG 128 at the cursor address indicated by RM 31, by means of A/S44. When TP2 occurs, AND gate 133 will be fully conditioned; this sequence will STOP and FF131 will be reset. Thus, the typed character is written where the cursor was.

Figure 11:
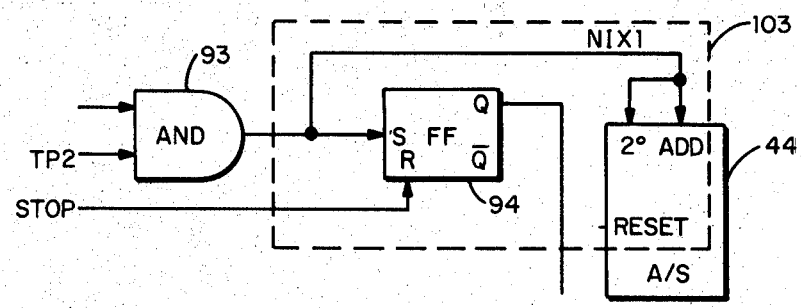
FIG. 11 illustrates the logic employed after a character is typed for writing the cursor into the next unprotected location.

The program will then write the cursor into the next unprotected location in display 29. Now referring to FIG. 8A, FIG. 8B and FIG. 11, the following sequence occurs. For ease of illustration, FIG. 8A and FIG. 8B have not been redrawn, but instead that portion of FIG. 8A within dotted lines 103 has been shown in FIG. 11. Thus, this function incorporates all of FIG. 8A and FIG. 8B with changes as shown by the circuit contained in the dotted lines 103 of FIG. 11. Thus, the same logic elements as originally described with reference to FIG. 8A and FIG. 8B are used during this function. The only difference is that logic contained within dotted lines 103 is replaced according to the specific function required. The different logic which may be utilized in area 103 is connected to the overall circuit of FIG. 8A by means of steering logic not shown, but which is well known in the art. That is, by using different combinations of AND and OR gates and controlling this logic by the different function commands, any individual circuit may be steered into the overall system. For example, referring to FIG. 8A, suppose AND gate 101 is desired for one function and not another. The Q output of FF94 could be connected to another AND gate input, not shown, which would be enabled by its other input only when the proper function is transferred by CPU39. The output of this additional steering AND gate would be the present input from the Q output of FF94.

The last cursor location having been stored in CPU39, it will be sent to the address input of RM31 and will be read on the occurrence of TP1. Since a $\rho$, $\theta$ and characters between a $\rho$ and a $\theta$, for illustration are not present, the output of OR gate 104 will be a logical one. On the occurrence of TP1A, the STORE command will be generated via AND gate 96, storing the character at the last cursor location in TSRG100. The cursor indication at TSRG100, that is, at the $2^7$ binary input, will be a logical zero, since FF94 has not been set, thus preventing AND gate 95 from setting FF97. When TP2 occurs, AND gate 93 will send a NIX1 pulse to A/S44. The NIX1 pulse will increment A/S44 by $2^0$. When TP2 now goes from a logical one to a logical zero, FF94 will be set such that its Q output presents a logical one to AND gate 95. When TP1 again occurs, a READ command will be generated, temporarily storing the character at this next increment location in TSRG100. However, since AND gate 95 will now be enabled on the occurrence of TP1A, setting FF97, a logical one will be present at the binary $2^7$ cursor input of TSRG100. This logical one cursor indication will be interpreted by CG30 as a racetrack pattern; that is, a cursor. Also on the occurrence of TP1A, this cursor location will be stored in RM31. After storing the cursor location and terminal number in RM31, TP2 will stop the cycle by means of FF98 and AND gate 99, as has previously been explained. The cursor now being stored in the next unprotected location, the operator is free to type another character.

Where a $\rho$, $\theta$, or a character between a $\rho$ and a $\theta$ present at the next unprotected location in display 29, the cursor could not have been written. This is because one of the three inputs to OR gate 104 would have been a logical one thereby presenting a logical zero at the output of OR gate 104 and disabling AND gate 95 from presenting a logical one cursor indication to TSRG100 via FF97.

The three above-mentioned functions, that is, the function of unloading the cursor location into CPU39, loading a typed character into the location where the cursor is, and moving the cursor to the next unprotected location, repeats for each character typed by the operator.

Should the operator desire, he may manipulate the cursor in many different ways. The operator may, in addition to moving the cursor forward, move the cursor back one space or he may write the cursor in the next unprotected variable data block. The operator may also move the cursor back to HOME, vertically one line or one vertical tab, or horizontally backward or forward a horizontal tab.

As an indication of the implementation of these functions, two representative cursor functions will be discussed. They are the functions of moving the cursor back one space, and the function of writing the cursor in the next unprotected variable data block.

Figure 12:
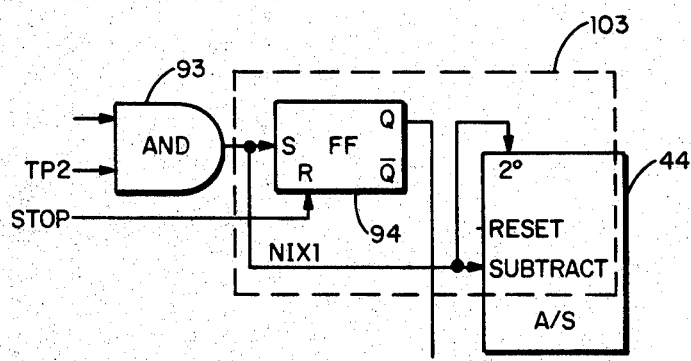
FIG. 12 and FIG. 13 in combination with FIG. 8A
Figure 13:
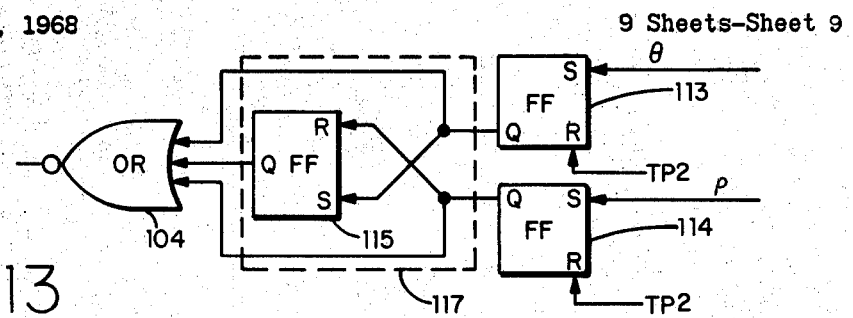

Now, with reference to FIG. 8A and FIG. 8B, in combination with FIG. 12 and FIG. 13, the "move the cursor back one space" function will be described. Again like FIG. 11, FIG. 12 and FIG. 13 should replace circuits contained within dotted lines 103 and 117 respectively. FIG. 12 indicates the same circuit as that shown in FIG. 11, except that the NIX1 pulse will subtract a binary $2^0$ from the address contained in A/S44.

Because we are moving the cursor back one space during this function, instead of protecting characters after $\rho$, we must now reverse the process and protect the characters after $\theta$. It is therefore necessary, referring to FIG. 13, to reverse the set and reset inputs of FF115. The Q output of FF113 will now be connected to the set input of FF115, while the Q output of FF114 will be connected to the reset input of FF115. The new connections shown in FIG. 13 and original connections as shown in FIG. 8B will be implemented through steering logic as has been described above with reference to FIG. 11.

When the operator requests CPU39, by means of terminal 28, to write the cursor back one space, as in the case where the operator may wish to erase the just typed character, the following will occur. The following descriptions holds for the case where neither a $\theta$, $\rho$, nor protected format characters between a $\theta$ and a $\rho$ are presented at the output of RM31. Briefly, the present cursor location will be read and stored in TSRG100. TP1A will not enable AND gate 95 since FF94 has not been set. The character just typed will be stored in RM31. TP2 will increment A/S44 back one address location because the NIX1 pulse will now direct A/S44 to subtract a binary $2^0$ from its address indication. When TP2 becomes a logical zero, FF94 will become set. The next timing pulse, TP1, will READ the new backspaced character location. In addition, when TP1A occurs, AND gate 95 will now be enabled, setting FF97, and therefore presenting a cursor indication to the $2^7$ binary input of TSRG100. This input will be interpreted by CG30 as a cursor. During the remainder of the cycle, the cursor location and terminal number will be stored in RM31, after which a STOP command will be sent to CPU39.

If, however, a protected character, a $\theta$, for example, was sent by AND gate 112, this would have set FF113. Remember that during this backspacing cursor function, the characters between $\theta$ and $\rho$, that is, after $\theta$ and before $\rho$ will be protected. The Q output of FF113 now being a logical one, the output of OR gate 104 will be a logical zero, thus disabling the cursor from being written in a protected character location. The same will apply for the next character, still backspacing. Because TP2 has reset FF113, this set FF115. FF115 will remain set for the remaining backspace locations until the trailing edge of the format control character $\rho$. FF115 being set, this will disable the cursor from being written. When the format control character $\rho$ occurs, this will set FF114, also presenting a logical one at the output of OR gate 104, and therefore, setting FF97 so that a cursor may now be written. Thus, when the first backspace location occurs in a protected area, the system will automatically move and write the cursor back to the first unprotected location after a ρ.

Figure 14:
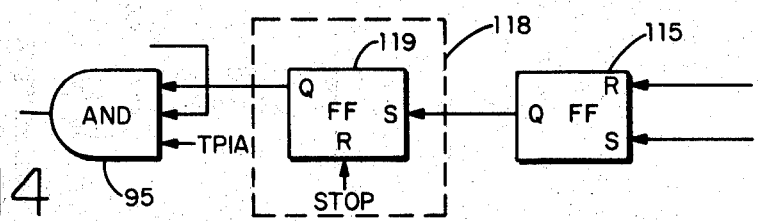
FIG. 14 in combination with FIG. 8A, FIG. 8B

The second example of the cursor write function is the ability to the system, in combination with its unique protect features, to write the cursor in the next unprotected variable data block. For example, the operator now completing the variable data after NAME, will desire to write the patient's age in the first unprotected location after AGE. In so doing, it would be very inconvenient and time-consuming for the operator to type the space key for each blank after NAME left available after the name, JOHN SANDERS, has been typed. Instead, it is very desirable to be able to control the cursor to the next unprotected variable data block. In order to explain this function, reference should now be made to FIG. 8A and FIG. 8B, in combination with FIG. 11 and FIG. 14. As before, the logic circuit contained in the dotted line area 118 of FIG. 8B will be replaced by dotted line area 118 of FIG. 14, as will dotted line area 103 of FIG. 11 replace dotted line area 103 of FIG. 8A. As mentioned above, this implementation will be accomplished by steering logic. The operation, as mentioned above, in moving the cursor to the next unprotected location, will be repeated except that FF119 will now allow the system to bypass the remaining variable data spaces and the fixed format character location, and write the cursor in the next unprotected variable data block.

When the operator desires to employ this function, he will request CPU39 by means of terminal 28. Steering logic will be set up such that OR gate 104 will be replaced by FF119. It can be readily seen that a cursor cannot be written until FF119 is set. Because OR gate 104 is not in this circuit, a logical zero will be present at the binary $2^7$ input of TSRG100 during the remaining variable data character spaces. Spaces will be printed in these locations until a ρ appears at the output of RM31. The format control character ρ will set FF114 and FF115 will be set when TP2 resets FF114. FF119 will not be set until FF115 is reset by the first TP2 after a format control character θ. When FF115 is reset, this sets FF119 so that the Q output of FF119 is a logical one. This allows the cursor to be written into the first character location after a θ, which location is defined as the beginning of an unprotected variable data block. Thus, the remaining variable data locations have been bypassed as have the protected format characters, such that a cursor is written in the next unprotected variable data block. This function is then stopped after the cursor location and terminal number have been stored in RM31.

The operator is now free to continue the above-mentioned process of typing the patient's essential information as required by the fixed format. Once the operator is satisfied with the information contained in the form displayed on display 29 and now stored in RM31, he requests the function of unloading the variable data from RM31 into memory unit 37 by means of CPU39, as will now be explained.

The operator now desires to send variable data from RM31 to memory unit 37. The variable data will be changed from an uncompressed form to a compressed form (FIG. 5) so that memory space will be saved. Note that the fixed form 10 need not be sent to memory unit 37 since it has already been permanently stored there. The operator requests, via terminal 28, that the CPU39 store the variable data in memory unit 37. Now referring to FIG. 7, CPU39 sends the first control word containing a starting address to the start address input of A/S44. CPU39 then sends the next control word, a function command to AND gate 76 and, in addition, sets up steering logic 157 for the circuit in FIG. 7. Recognizer AND gate 76 is wired such that an output will result when it is conditioned by this function command. Its output will set FF77, FF77 remaining set for this entire function. The Q output of FF77 is connected to one input of AND gate 78. When TP1 occurs, AND gate 78 will be fully conditioned, thus producing a NIX1 pulse. The NIX1 pulse, for this function, will, on its rising edge direct RM31 to READ and will, on its trailing edge, command A/S44 to ADD and increment the address position by $2^0$.

A format control character ρ is the first character of both the fixed format and variable data in RM31. When the READ command occurs, the ρ will be transferred to and partially condition AND gate 85. The ρ will also fully condition AND gate 79, setting FF81. FF81 will not be reset until the trailing edge of TP2 occurs. The Q output of FF81, now a logical one, will fully condition AND gates 85 and partially condition AND gate 86 via OR gate 84. The trailing edge of TP1 will then increment A/S by one to the next address position. When TP2 occurs, this will enable BRG75, and the character ρ will be stored therein. The output of AND gate 86 will also instruct CPU39 that data is ready to be transferred to it. CPU39 will then operate to take the contents of BRG75 and store it in memory unit 37. The trailing edge of TP2 will then reset FF81 setting FF83.

It should here be noted that the Q output of FF81 will not set FF83 until it goes from a logical one to a logical zero. The purpose of FF83 is to disable the system, during this function, from sending fixed format characters to CPU39; i.e., FF83 protects a block of characters as defined by format control characters.

Because FF83 has now been set, its $\bar{Q}$ output will be a logical zero, and will remain as such until reset. When the TP1 again occurs, it will produce an output from AND gate 78 because the other input of AND gate 78, the Q output of FF77, is still a logical one. The output of AND gate 78 will command RM31 to READ the next character in its memory. The next character will be the first fixed format character. Let us assume, for illustration purposes, that NAME will be the first fixed format word. When the character N occurs at the output of RM31, it will be inhibited by AND gates 79 and 80, and will be presented to AND gates 85. The only way that AND gates 85 will transfer the character N will be if a ρ, θ, or the $\bar{Q}$ output of FF83 is a logical one. The ρ and the θ will not be present since TP2 continually resets FF81 and FF82. Also, since FF83 remains set, it will thus be reset after a θ appears at the output of RM31. The $\bar{Q}$ output of FF83 will thus be a logical zero, and will not allow the character N to be sent to CPU39. The same condition applies for the remaining three characters of the fixed format word NAME.

The next character after character E to be sent out of RM31 will be a θ and will occur at the presence of the next TP1 which commands RM31 to READ. The θ character will be allowed through recognizer AND gate 80 and will set FF82. The Q output of FF82 being connected to one input of OR gate 84, allows the θ to be passed through AND gates 85 and sent to memory unit 37 by means of CPU39. When TP2 resets FF82, FF83 will be reset, so that $\bar{Q}$ output of FF83 will be a logical one. When the first variable character J is read out of RM31, it will also be inhibited by AND gates 79 and 80, but will be allowed through AND gates 85 because of the presence of a logical one at the control inputs of AND gates 85. In a like manner, the output of OR gate 84, in the presence of TP2, instructs the CPU39 that data is available and enables BRG75 to store the first variable character J, which is then handled by CPU39 and sent to memory unit 37. For the remaining variable characters before the next ρ, the $\bar{Q}$ output of FF83 will remain a logical one and will in turn allow the remaining variable characters to be stored in memory unit 37. When the next ρ occurs at the output of RM31, the above-mentioned cycle will be repeated until the full page of variable characters is stored in memory unit 37 after which the A/S44 sends a STOP command to CPU39 and also resets FF77.

It has thus been shown the means by which variable data is sent from RM31 to memory unit 37 and stored in memory unit 37 in a compressed form as shown in FIG. 5. That is to say, only $\rho$'s, $\theta$'s, and variable characters are now contained in memory unit 37 representative of the variable data entered onto the display 29 by the operator earlier. It must be remembered that fixed format characters are already stored in memory unit 37 and it is never necessary to restore the fixed form.

The variable data is now stored in compressed form in memory unit 37, as shown in FIG. 5. Also stored in compressed form is the fixed format form as shown in FIG. 2. At some future time, the operator may desire to display the Admittance Form of John Sanders. The operator requests, by use of keyboard 35 of terminal 28, that they be presented on display 29. The request is made by pressing the proper command key. The display of the fixed format Admittance Form has already been discussed above. The discussion of the process of transferring the variable data, interlaced with the fixed format data on display 29, follows.

Now referring to FIG. 6, upon a REQUEST command by the terminal 28, the CPU39 sends a starting address control word to A/S44. The next control word sent from CPU39 is a function command which sets the steering logic 159 such that the logic elements in FIG. 6 are essentially connected as shown. The CPU39 retrieves the variable data, shown in FIG. 5, from memory unit 37 by conventional means, not the subject matter of this invention. The first character to be transferred by CPU39 to BRG55 is a format control character $\rho$. BRG55 is enabled by the data strobe pulse which occurs at the same time that the $\rho$ is transferred by CPU39. As stated before, a data strobe will be generated each time a character is transferred from CPU39. The data strobe also sets FF57, its Q output becoming a logical one. The CPU39 also generates a TP1. TP1 and the Q output of FF57 conditions AND gate 58 to produce a NIX1 pulse. The NIX1 pulse commands RM31 to READ the fixed format character in RM31, which is at the location indicated by the starting address.

It should be noted that the fixed format form and the variable data, when called by terminal 28, will appear to the operator to be presented to display 29 simultaneously. The fixed format characters and variable characters are read in an interlaced manner such that the word blocks defined by the format control characters are protected. The fixed format words are read out first and the variable data are then read out and written into the spaces defined for variable data. When the first $\rho$ of the fixed format form, as shown in FIG. 2, is read at the output of RM31, this is allowed through recognizer AND gate 59 which is wired in a like manner as was previously discussed for AND gate 40. The $\rho$ output of AND gate 59 sets FF60. The Q output of FF60 will set FF61 only when FF60 is reset. $\rho$ is also transferred to one input of OR63 and OR gate 69, which operation will be discussed below.

The purpose of comparator 56 in combination with OR gate 63, OR gate 65, and AND gate 64 is to initiate a STOP command to CPU39 when a $\rho$ transferred by CPU39 and a $\rho$ transferred simultaneously by RM31 are not coincident. The same applies for the coincidence of $\theta$'s. The reason for this is to insure that the variable data will be properly composed between the $\rho$'s and $\theta$'s of the fixed format. If this condition is not present, the operation of the CPU39 will be interrupted. If a $\rho$ is present at both inputs A and B of the comparator 56, the output will be a logical zero because the comparator 56 contains an inverted output as represented by the small circle. If a $\rho$ is absent from either or both inputs of the comparator 56, the logic of the comparator 56 is so arranged that its output will be a logical one. When a $\rho$ is sent to input A of comparator 56 from BRG55 and a $\rho$ is sent to input B of comparator 56 from RM31, a logical zero will be sent to AND gate 64. Also present at the other input of AND gate 64 is a $\rho$, which has been passed through OR gate 63. However, the ERROR signal will not be sent since the comparator output is a logical zero, not fully conditioning AND gate 64. However, for further explanation, if an error in the system were present, i.e., if a $\rho$ was sent by RM31 and the CPU39 did not send a $\rho$, then a logical one would be transmitted by comparator 56 to one input of AND gate 64. Since a $\rho$ is present at the other input of AND gate 64 from RM31, an ERROR signal would then be generated through OR gate 65, sending a STOP command to CPU39, and resetting FF57, thus stopping further READ operations of RM31.

Further proceeding, the $\rho$ at the output of CPU39 in BRG55 will not be allowed through AND gates 66 since the PROTECT AREA, PA, control pulse is not present at the other inputs of AND gates 66. The purpose of the PA control pulse as used in this circuit is to disable the system from sending fixed format characters when variable data is being sent to display 29. The PA control pulse will be present only when FF60 is reset by the presence of a $\theta$, the resetting action of FF60 setting FF61. Thus, FF61 protects the area defined as fixed format characters from being written over variable data. This operation will be more fully exploited later in the discussion.

The next sequence after a $\rho$ has been presented at both the output of the CPU39 and RM31 is the instruction to A/S44 to ADD a binary $2^0$ so that the RM31 address position is incremented by one. This is accomplished when the NIX1 pulse goes from a logical one to a logical zero. That is to say, A/S44 will increment itself by one on the trailing edge of the NIX1 pulse. A/S44 will in turn increment the RM31 address to the next position; i.e., one position after that indicated in the starting address command be CPU39.

The logic is now ready for the next character to be read out of CPU39. However, before the CPU39 can read out the next character, the CPU39 must be commanded to SEND. Logic provided to do this is contained in OR gate 69, AND gate 62, FF70 and FF71. Initially FF70 is set by the data strobe pulse. The data strobe also resets FF71. When either a STORE command, a $\rho$, or a $\theta$ is presented to OR gate 69, one of these pulses will be sent to one input of AND gate 62. The Q output of FF70 is the other input to AND gate 62. Both inputs to AND gate 62 being a logical one, its output sets FF71 which has previously been reset by the data strobe. The Q output of FF71 then commands the CPU39 to send another character. The CPU39 transfers the next variable character, in this example a $\theta$, to BRG55, replacing the $\rho$ previously there. The $\theta$ is disabled from being sent to the data input of RM31 by AND gates 66 since FF61 has not been set. The data strobe pulse sent with each character transferred by CPU39 and TP1 then commands RM31 to READ the next character contained in its memory. This character will be the next edit control character, HOME, of the fixed format form as shown in FIG. 2 and discussed previously. Although the presence of a HOME at the B input of comparator 56 and the presence of a $\theta$ at the A input will be present a logical one to one input of AND gate 64, no ERROR will be generated since neither AND gate 59 nor AND gate 67 will present a $\rho$ or $\theta$ respectively to OR gate 63. The operation will then continue sending fixed format characters and A/S44 is incremented by one after each character incrementing RM31 to its next address position each time. The logic will not generate a SEND command to CPU39 since neither a $\rho$, or a $\theta$, nor a PA pulse is present at the input of OR gate 69. Therefore, the $\theta$ will remain in BRG55.

The cycle continuing in a like manner for all the following fixed format characters, i.e., HT, up to character E, as was described before in that they are read out of memory unit 37 into CPU39 through RMCU32 to RM31 and subsequently presented on display 29, a fixed format character $\theta$ will be read at the output of RM31. When a θ of the fixed format is finally READ out of RM31, the following operation occurs.

The θ will fully condition recognizer AND gate 67, which is wired to allow an output for only a θ input. Because of the presence of a θ at both of its inputs, remember that during the time the fixed format characters were read onto display 29, a θ of the variable data was stored in BRG55, comparator 56 will output a logical zero, and no ERROR command will result. θ will then pass through OR gate 69, resulting in a SEND command to CPU39. The next character at the output of CPU39 will be a J (see FIG. 5) which will replace the θ in BRG55. θ having reset FF60, thus setting FF61, the Q output of FF61 will partially condition AND gate 68 and will allow the character J to be passed through AND gates 66. The next READ command generated by TP1 will not only command RM31 to READ but will fully condition AND gate 68 and command RM31 to STORE. The STORE operation results because of the simultaneous presence of the Q output of FF61 and NIX1 pulse at the inputs of AND gate 68. Thus, the character J is stored in RM31 and read onto display 29.

The NIX1 pulse also will increment RM31 to the next address position by means of A/S44. After the character J is read and stored in RM31 the STORE command will also cause CPU39 to SEND the next character, O. Remember that during the display of the character J and the next 21 characters, the RMCU32 will inhibit the fixed format characters from being sent to the display 29, leaving these character spaces blank for the variable data to be displayed. Therefore, after the character J and for the next 21 spaces, the READ commands will cause successive variable data characters to be displayed. Finally with the output of a ρ by CPU39, and a ρ by RM31, FF60 will be set and FF61 will be reset such that storing operations of the variable data in RM31 will cease. Storing and read operations of variable data will again continue after the next θ out of SPU39 and RM31.

This cycle shown directly above will continue until A/S44 accumulates to the maximum number of characters displayable by display 29, at which time A/S44 will output a STOP command. The STOP command will be allowed through OR gate 65 and will reset FF57 and STOP the operation of CPU 39. The fixed format form and the variable data of John Sanders are now displayed on display 29 and the operator may now create a hard copy by means not shown, or may simply use a part of the data presented for any purpose dictated by the patient's needs.

Having explained the process of saving spaces in memory by uniquely identifying blocks of characters and protecting, in one embodiment, the fixed format characters, by means of first and second format control characters ρ and θ, respectively, another desirable embodiment of this invention is now explained. From the above explained circuits, it was necessary, in order to protect characters, that said format control characters, ρ and θ, be used before and after, respectively, the characters to be protected. This meant that in some situations, in order to protect other edit control characters CR, HOME, HT, and VT, two additional format control characters would be required. In order to circumvent this necessity for two additional format control characters, edit control characters were inserted between the ρ and θ with the fixed format characters so that they were protected with the fixed character. However, this is not completely desirable, since were it desired at some later time to statistically tabulate, for example, the number of males admitted to the hospital from a certain city, programming would become more complex.

For instance, referring to FIG. 2, by using comparison techniques for the fixed format word ADDRESS, the program would select said word by searching the completed form by word block as defined by the format control characters ρ and θ. However, in this form, the word block containing ADDRESS after ρ in character position 33 would also include a control character CR. The program would have to be written such that any control characters or other program information in the word block would be neglected. This is more important where different forms are used, wherein word blocks of fixed format words are set up differently. For example, where in this form, the word block containing ADDRESS includes CR, in another form, whis is to be correlated with the Admittance Form, the word block containing ADDRESS may contain no other character.

Figure 15:
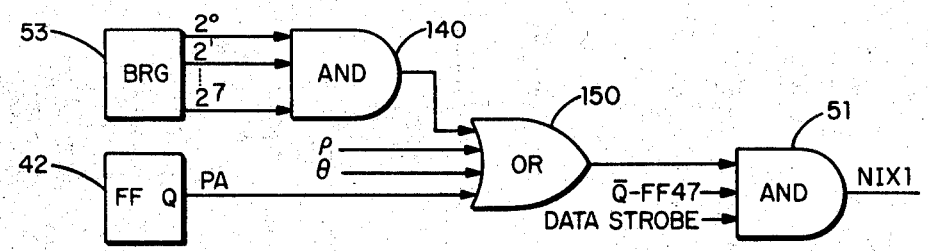
FIG. 15 in combination with FIG. 4 illustrates the logic employed to self-protect edit control characters when they are called up to the display and in addition the logic employed to store in the memory unit program pointer information and self-protect it without displaying that information when the form is called to the display.
Figure 16:
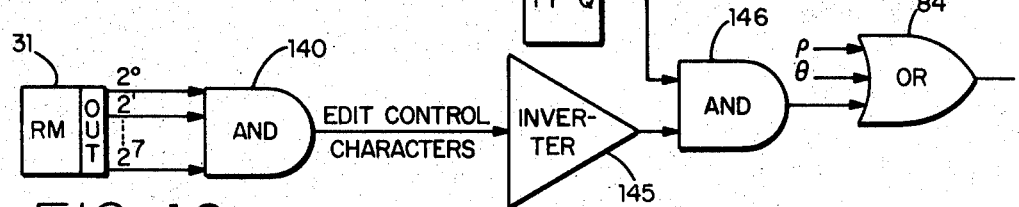
FIG. 16 in combination with FIG. 7 illustrates the logic employed to self-protect edit control characters when the variable data is being unloaded from the refresh memory to the memory unit.
Figure 17:
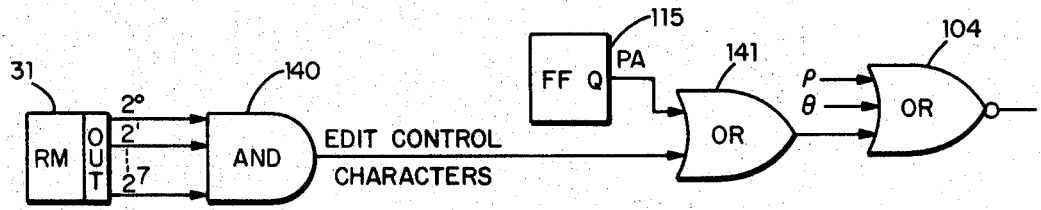
FIG. 17 in combination with FIG. 8A

Therefore, this embodiment allows the edit control characters CR, HOME, HT, and VT to stand alone in RM31 and not require format control characters ρ and θ to protect them. With reference to FIG. 15, FIG. 16 and FIG. 17, circuitry is shown which when added to above-mentioned circuits either fixedly or through steering logic will provide a self-protect of the edit control characters.

When the operator requests the particular form to be presented on display 29 in the main embodiment, only characters between first format control character ρ and second format control character θ will be displayed. However, when the feature of self-protect for edit control characters is employed by definition, the edit control characters do not appear between the format control characters ρ and θ. Therefore, it is necessary in order to store the edit control characters to devise a circuit which will act on the edit control characters in the same manner as in the main embodiment but which will now enjoy a self-protect feature.

Now referring to FIG. 4 and FIG. 15, circuitry is shown which will accomplish the above-mentioned purpose and in combination therewith will provide another function whereby program information not inserted between characters ρ and θ will not be read on display 29 nor stored in RM31 and in addition will be self-protected, the latter function to be discussed later. AND gate 51, which when conditioned will present a NIX1 pulse, must now be conditioned by a third input from OR gate 150. The reason for this is that, in addition to requiring NIX1 pulse for a ρ, θ, and fixed characters between these two format control characters, a NIX1 pulse is now required after a θ for specific edit control characters. Therefore, further explaining, when CPU39 transfers an edit control character to BRG53, any of these characters fully conditions AND gate 140. The output of AND gate 140 is the third input to AND gate 51 via OR gate 150. OR gate 150, in addition, has three other inputs; namely, a ρ, a θ, and the Q output of FF42 (the protect area, PA, signal). The reason for the ρ and θ inputs is that the ρ and θ characters may not necessarily be coincident with the PA signal, and would therefore not result in a NIX1 pulse.

A partial cycle for calling up the fixed format to display 29 will now be explained incorporating the self-protect feature for edit control characters. A ρ transferred from CPU39 to BRG53 will fully condition AND gate 40 setting FF42. The presence of a ρ will partially condition AND gate 51. The data strobe pulse and the Q output of FF47, now a logical one, will fully condition AND gate 51, allowing AND gate 48 to pass the ρ to the data input of RM31. The NORM command will then read and store this information at the address indicated by A/S44. NIX1 will then increment A/S44 by one. The PA signal remaining present, all characters after ρ will be read and stored. The format control character θ will also be read and stored in a similar manner as was the format control character ρ.

The next character after θ will be interpreted as a binary number indicative of the amount of spaces to be skipped for future variable data; see the detailed explanation for this portion of the function. Remember that this binary number is neither read nor stored in RM31, and that AND gates 46 are enabled by the Q output of FF47 allowing A/S44 to ADD that skip number of spaces indicated.

If an edit control character is then transferred from CPU39, AND gate 140 will be fully conditioned. The Q output of FF47, now a logical one, due to the resetting action by TP1; the data strobe being present; and one of the third inputs of AND gate 51, namely the edit control character, being present; AND gate 51 is now fully conditioned and will allow readout and storage of the edit control character in RM31. NIX1 will then increment, via A/S44, the address input of RM31. Thus, it has been shown means to self-protect edit control characters even though they are not stored in the format control character protected area. Because of this feature, it may readily be seen that there is a savings in main memory space since an edit control character need not be flanked by format control characters. This, in certain situations, could reduce main memory space from three spaces to one space per edit control character. It may also be seen that because of this self-protect feature, programming is made less difficult.

Now allowing the edit control character to be self-protective and not contained between the format control characters, it is necessary when unloading variable data from RM31 to CPU39 and subsequently memory unit 37, to inhibit the edit control characters from also being unloaded with the variable data. Protect area flip-flop FF83 develops a logical one at its Q output only after a $\theta$ has been presented at the output of RM31. The Q output, being a logical one, allows all data characters after it to be transferred to CPU39 via AND gates 85 and BRG75. However, now contained after the format control character, may be contained an edit control character. Means must be devised to disable the edit control character from being sent to CPU39.

Figure 7:
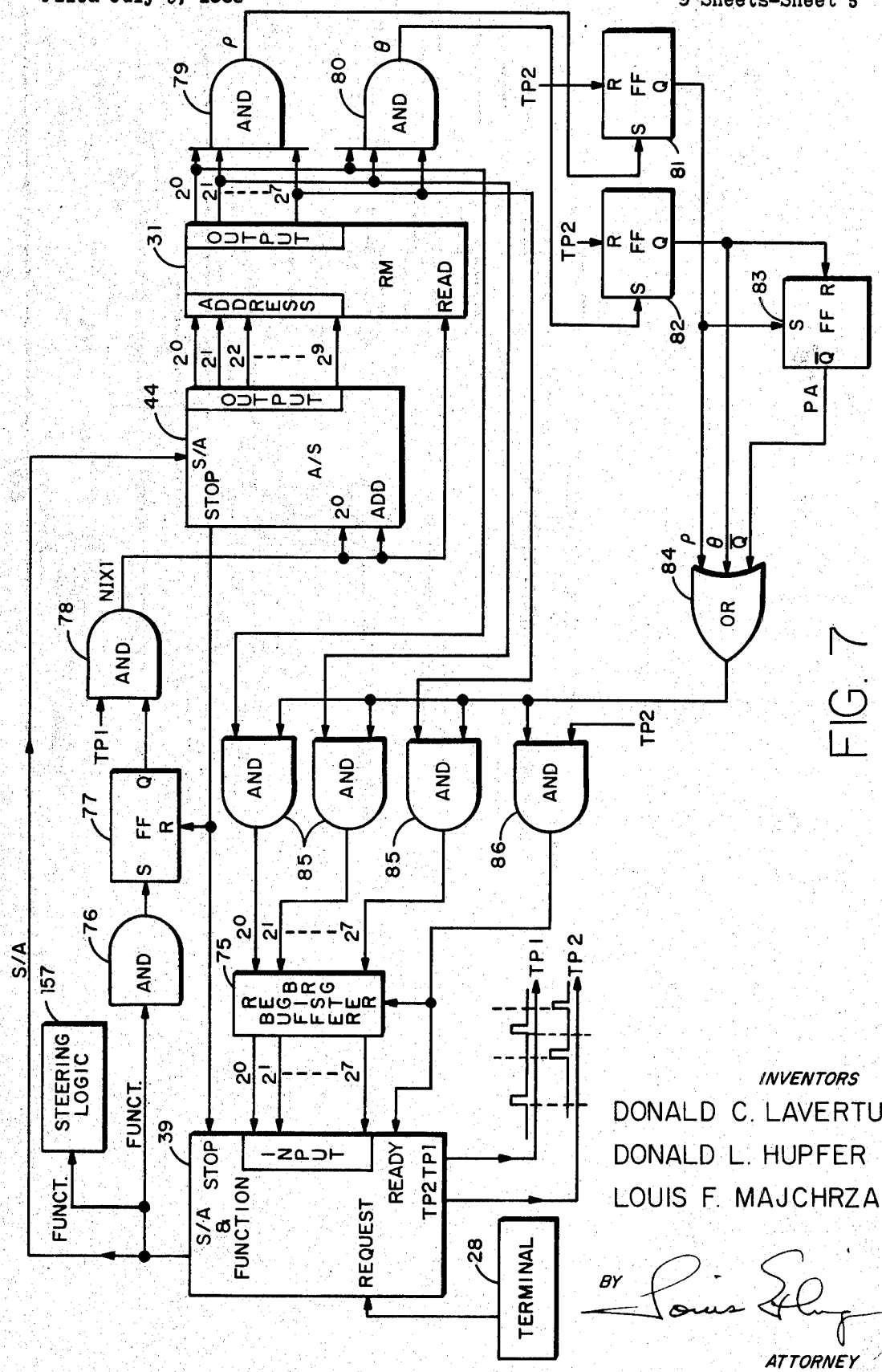
FIG. 7 illustrates the logic employed to unload variable data from the display to the main memory in compressed form.

Now referring to FIG. 7 and FIG. 16, when RM31 presents an edit control character at its output, AND gate 140 is fully conditioned. The output of AND gate 140 is inverted by inverter 145 so that during the presence of an edit control character, AND gate 146 is not fully conditioned, thereby disabling the logical one at the Q output of protect area flip-flop FF83 from enabling AND gates 85 via OR gate 84. Thus, the edit control characters are not seen to CPU39 when the unload variable data function is operative.

This feature of providing self-protect for edit control characters is especially important in relation to the cursor placement functions. Now with reference to FIG. 8A, FIG. 8B and FIG. 17, the protect area flip-flop FF115 will disable the cursor from being written in that and second format control character $\theta$. The $\rho$ character block between first format control character $\rho$ and $\theta$ cannot be written over by a cursor because the $\rho$ and $\theta$ directly disable OR gate 104 from presenting a logical one at its output.

In a similar fashion, when RM31 presents an edit control character output, AND gate 140 will be conditioned; i.e., AND gate 140 will have an output if an edit control character OR, HOME, HT or VT is presented at its input. The output of AND gate 140 and the Q output of protest area FF115 are connected to the input of OR gate 141. If either input presents a logical one, OR gate 104 will transfer a logical zero to AND gate 95, thereby disabling the cursor from being written. Remember that since AND gate 95 is not set, FF97 is not set, therefore presenting a logical zero, or non-cursor representation to the binary $2^7$ input of TSRG100. Had FF97 presented a logical one, this would have been interpreted as a cursor write function by CG30. Thus, by means of this circuit, a cursor is prevented from being written over an edit control character regardless of whether it is placed between the format control characters $\rho$ and $\theta$, or after the $\theta$.

As mentioned previously, it would be very desirable, in order to reduce programming difficulties, to include the capability in the system for inserting information such as housekeeping or pointer information. Information of this type would allow the system to display only part of a fixed form, or give the CPU39 immediate access to the number of characters at any point in the fixed form. However, this information being for program use only, it is not desirable to display it.

Now referring to FIG. 4 and FIG. 15, the capability of the system to contain program information outside of a protected character block after the format control character $\theta$, and after the skip binary number without presenting it to display 29 will be discussed. If AND gates 48 are disabled when program information is transferred from CPU39, RM31 will not read or store any data at its input. In order to accomplish this, the NIX1 pulse must not occur when the program information is presented. Therefore, AND gate 51, which produces the NIX1 pulse is enabled by its third input only when an edit control character, a format control character, or the PA signal is presented to one input of OR gate 150. Since neither an edit or format control character is present, only a PA signal will enable the NIX1 pulse. Remember that after a $\theta$ resets FF42, its Q output will not again be a logical one until a $\rho$ is transferred by CPU39. Therefore, the PA signal is not present and will not enable AND gate 51, and subsequently, AND gates 48. Thus, program information is not read, nor is it stored in RM31. It has therefore been seen that information may be self-protective and at the same time not presented on display 29 even though this program information is not placed in a protected block of fixed characters.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In a computer driven display system including first and second memories wherein said first memory has a plurality of characters stored therein and wherein said second memory refreshes a display, apparatus for uncompressing a first plurality of characters stored in said first memory in compressed form and transferring said uncompressed characters to said display comprising:
   means for accumulating a character address signal;
   means for generating a first signal upon the occurrence of a first format control character, a second format control character or characters between said first and second format control characters;
   means, including said second memory, for storing said characters in character addresses for continuous refresh of said display;
   means for reading said characters from said second memory into said display;
   means for incrementing said accumulator address signal by one address position after each of said first plurality of characters as indicated by said first signal is read and stored;
   means for incrementing said accumulator address signal by a variable number as indicated by the first character following said second format control character;
   means for disabling said character indicative of said variable number from being read or stored;
   means for requesting said first memory to send another character to said second memory after said accumulator is incremented; and means for inserting characters with said first plurality of characters in said first memory between said second format control character and said first format control character and after said character indicative of a variable number, and disabling said characters from being read or stored when said first plurality of characters are uncompressed.

2. In a computer driven display system including first plurality of characters stored therein and wherein said first and second memories wherein said first memory has a second memory refreshes a display, apparatus for uncompressing a first plurality of characters stored in said first memory in compressed form and transferring said uncompressed characters to said display comprising:

means for accumulating a character address signal;

means for generating a first signal upon the occurrence of a first format control character, a second format control character or characters between said first and second format control characters;

means, including said second memory, for storing said characters in character addresses for continous refresh of said display;

means for reading said characters from said secondary memory onto said display;

means for incrementing said accumulator address signal by one address position after each of said first plurality of characters as indicated by said first signal is read and stored;

means for incrementing said accumulator address signal by a variable number as indicated by the first character following said second format control character;

means for disabling said character indicative of said variable number from being read or stored;

means for requesting said first memory to send another character to said second memory after said accumulator is incremented; and means for generating a second signal upon the occurrence of said first or second format control characters, therebetween or an edit control character such that a read and store command will be generated for each of said first plurality of characters and in addition upon the occurrence of said edit control character.

3. Display apparatus in which characters stored in a first memory are displayed on a display surface, said first memory including memory address means for pointing to storage locations of the memory and means for writing characters in and means for reading characters from said storage locations in accordance with the address pointer, said apparatus further comprising:

means for receiving a first set of characters indicative of a display format containing groups of characters interleaved with blank spaces, said character set being received in a compressed form where each character group is preceded by a first format control character and is succeeded by a second format control character and where a third format control character indicative of a number of blank spaces follows the second format character;

means responsive to the receiving means for expanding the first character set so as to change the position of the memory address pointer by one in response to the first or second format control characters or characters therebetween and to change the pointer position by a number equal to the number of blank spaces in response to the third format control character, said memory write means responding to said receiving and expanding means to write the received characters at storage locations in accordance with the address pointer; and data entry means for operating said memory address, read and write means to enter a second set of characters into the blank space storage locations between the second and first format control characters.

4. The invention as set forth in claim 3:

wherein said expanding means includes means for generating a first signal upon the occurrence of said first format control character, of said second format control character or of characters therebetween;

wherein said memory address means responds to said first signal to increment said pointer position by one storage location.

5. The invention as set forth in claim 4:

wherein said expanding means further includes means for disabling the reading and writing of said third format control character.

6. The invention as set forth in claim 5:

wherein said receiving means includes temporary storage means for temporarily storing each received character; and wherein said expanding means further includes means for transferring characters from the temporary storage means to the memory write means in response to said first signal.

7. The invention as set forth in claim 6:

wherein said reading means continually reads consecutive ones of the first memory storage locations so as to present any characters stored therein for display;

wherein said data entry means includes means for providing a cursor on said display surface;

means responsive to the reading of the first format characters to inhibit said cursor from occurring on the display surface until after the next second format character is read from the first memory; and means for causing said writing means to write the characters of said second set in those storage locations between the second and first format characters.

8. The invention as set forth in claim 7:

wherein the cursor providing means includes means for coding the first character which is read after the reading of a second format control character such that when said first character is rewritten, the cursor will then be stored in the storage location after the said second format control character; and wherein said means for causing includes means for incrementing the storage position of said cursor after each character of the second set is written into the second memory such that the characters of the second set are written at current cursor locations.

9. The invention as set forth in claim 8:

wherein said coding means includes:

means for recognizing said first and second format control characters;

means for enabling a first signal during the time between recognition of said first format control character and said second format control character;

means for enabling a second signal upon the absence of said first and second format control characters and said first signal; and means for interpreting said second signal as indicative of said cursor.

10. The invention as set forth in claim 7:

wherein said data entry means further includes means for deleting a random location of the cursor.

11. The invention set forth in claim 10 wherein said deleting means includes:

means for setting the address means to a storage location indicative of the present cursor location;

means for temporarily storing the character stored at said cursor storage location when read by said reading means;

means for coding said character to disable the cursor; and means for causing the writing means to transfer the coded character from the temporary storage means to said storage location.

12. The invention set forth in claim 6:

wherein said display reading means continually reads consecutive ones of the first memory storage locations so as to present characters contained therein for display;

wherein said data entry means includes:

means for recognizing the reading of said first and second format control characters by said reading means;

means for receiving and temporarily storing one of the characters of said second set until the recognition of the reading of a second format control character; and means for enabling the receipt of characters subsequent in sequence to said one character in response to the reading of the second format character and for enabling the writing of such subsequently received characters by said writing means at consecutively incremented positions of the address pointer until the recognition of the reading of a first format control character.

13. The invention set forth in claim 12:

wherein interrupt means provides an interrupt signal for the condition where a first or second format control character read from the first memory does not directly correspond to a first or second format control character, respectively, of said second character set being received.

14. The invention set forth in claim 3:

wherein said interrupt means includes:

means for comparing characters being read from said first memory with characters stored in the temporary stoarge means to produce a first signal upon the occurrence of said condition;

means generating a second signal upon the reading of either first or second format control characters from said first memory; and means for generating said interrupt signal upon the simultaneous occurrence of the first and second signals.

15. The invention set forth in claim 14:

wherein further apparatus including a second memory controlled by a computer is provided;

wherein said receiving means receives said first character set from said second memory; and wherein said data entry means receives said second character set from said second memory.

16. The invention set forth in claim 11:

wherein further apparatus including a second memory controlled by a computer is provided;

wherein said receiving means receives said first character set from said second memory; and wherein said data entry means includes manually operable means for providing said second character set.

17. The invention set forth in claim 3:

wherein said reading means continually reads consecutive ones of the first memory storage locations so as to present any characters stored therein for display; and wherein data compressing means responds to said continual reading to provide in compressed form only the first and second format control characters and all characters between said second format control character and said first format control character.

18. The invention set forth in claim 17:

wherein said data comprising means includes means for recognizing the reading of said first and second format control characters;

means signalling the presence of characters read after said second format control character and before said first format control character is read; and temporary storage means for holding said signalled characters.

19. The invention set forth in claim 18:

wherein further apparatus including a second memory controlled by a computer is provided;

wherein said data compressing means further includes means signalling the computer that the temporary storage means is holding a character for transfer to the second memory and means responsive to said computer for enabling the transfer of characters from the temporary storage means to said second memory.

References Cited

UNITED STATES PATENTS

| | | | |
|---|---|---|---|
| 3,037,192 | 5/1962 | Everett | 340—172.5 |
| 3,248,705 | 4/1966 | Dammann et al. | 340—172.5 |
| 3,346,853 | 10/1967 | Koster et al. | 340—172.5 |
| 3,364,473 | 1/1968 | Reitz et al. | 340—172.5 |

OTHER REFERENCES

Laschenski, J.; computer data presentation by display unit; IBM technical disclosure bulletin; vol. 9, No. 10, March 1967.

P. J. HENON, Primary Examiner

S. R. CHIRLIN, Assistant Examiner

PO-1050
(5/69)

UNITED STATES PATENT OFFICE
CERTIFICATE OF CORRECTION

Patent No. 3,566,361          Dated    Feb. 23, 1971

Inventor(s) Donald C. Lavertu et al

It is certified that error appears in the above-identified patent and that said Letters Patent are hereby corrected as shown below:

In Column 25 line 52 delete "and second format control character 0. In Column 25 line 60 "OR" should be --CR--. Column 25 line 62 "pi should be --protect--.

Column 27 after the word "first" on line 9 insert --and second memoi wherein said first memory has a --. Delete all of line 12.

Column 29 line 31 change "stoarge" to --storage--.

Signed and sealed this 7th day of September 1971.

(SEAL)
Attest:

EDWARD M. FLETCHER, JR.          ROBERT GOTTSCHALK
Attesting Officer                Acting Commissioner of Pa